United States Patent
Wade et al.

(10) Patent No.: US 8,713,215 B2
(45) Date of Patent: Apr. 29, 2014

(54) SYSTEMS AND METHODS FOR IMAGE STREAM PROCESSING

(75) Inventors: Jack Wade, La Jolla, CA (US); Charles Siewert, Del Mar, CA (US); Joel Brown, Encinitas, CA (US)

(73) Assignee: Z Microsystems, Inc., San Diego, CA (US)

( * ) Notice: Subject to any disclaimer, the term of this patent is extended or adjusted under 35 U.S.C. 154(b) by 31 days.

(21) Appl. No.: 13/609,133

(22) Filed: Sep. 10, 2012

(65) Prior Publication Data

US 2013/0073775 A1    Mar. 21, 2013

Related U.S. Application Data

(63) Continuation-in-part of application No. 12/776,048, filed on May 7, 2010, now Pat. No. 8,266,333.

(60) Provisional application No. 61/182,624, filed on May 29, 2009, provisional application No. 61/234,577, filed on Aug. 17, 2009.

(51) Int. Cl.
*G06F 3/00*    (2006.01)
*G06F 5/00*    (2006.01)

(52) U.S. Cl.
USPC ............ 710/30; 710/2; 710/5; 710/8; 710/54; 710/55

(58) Field of Classification Search
None
See application file for complete search history.

(56) References Cited

U.S. PATENT DOCUMENTS

2012/0229596 A1*   9/2012  Rose et al. ............... 348/36
2012/0251085 A1*  10/2012  Cheng et al. ............ 386/337

* cited by examiner

*Primary Examiner* — Scott Sun
(74) *Attorney, Agent, or Firm* — Sheppard Mullin Richter & Hampton LLP

(57) ABSTRACT

Various embodiments relate to systems and methods for simultaneously switching input image streams to output devices, while providing optional image processing functions on the image streams. Certain embodiments may provide vision systems and methods suitable for use in vehicles, particularly windowless vehicles, such as armored ground vehicles, submerged watercraft, and spacecraft. Some embodiments may enable sharing of image streams (e.g., with one or more other vehicles), generation of panoramic views (e.g., from various camera feeds), intelligent encoding of image streams, and implementation of security features based on image streams.

35 Claims, 30 Drawing Sheets

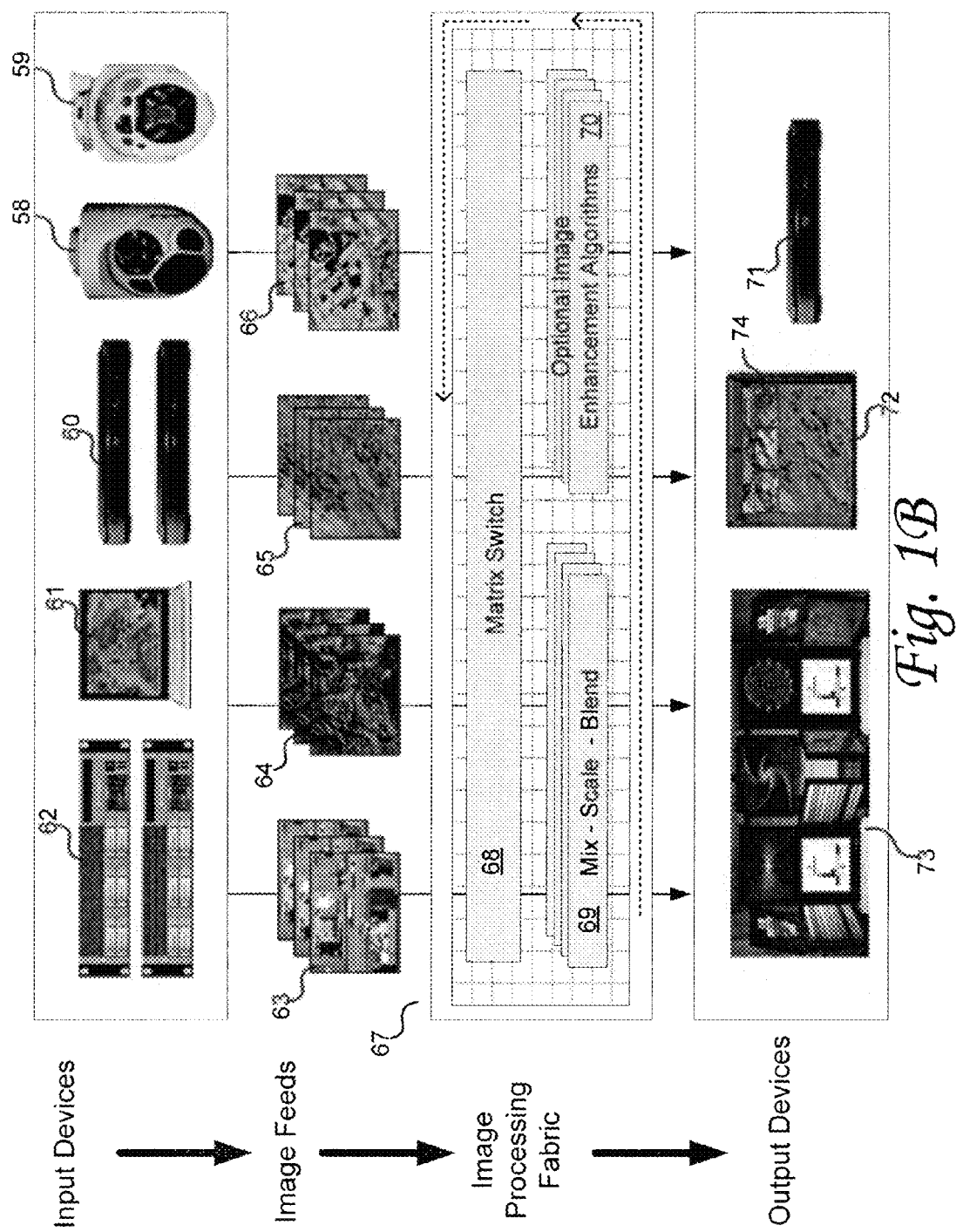

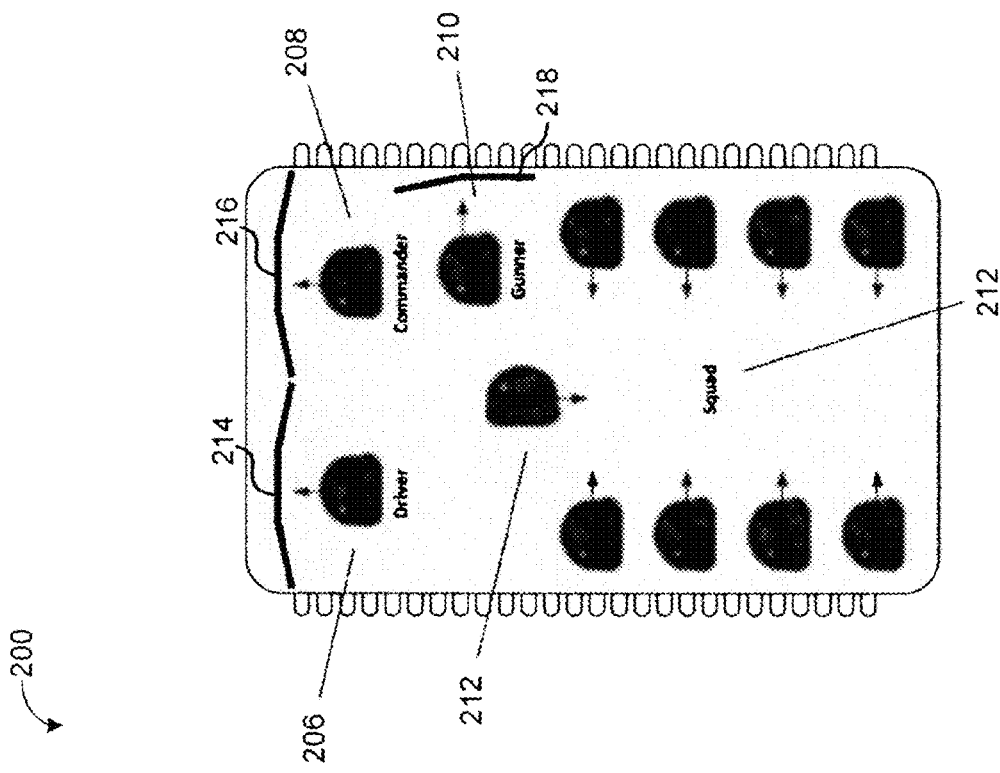
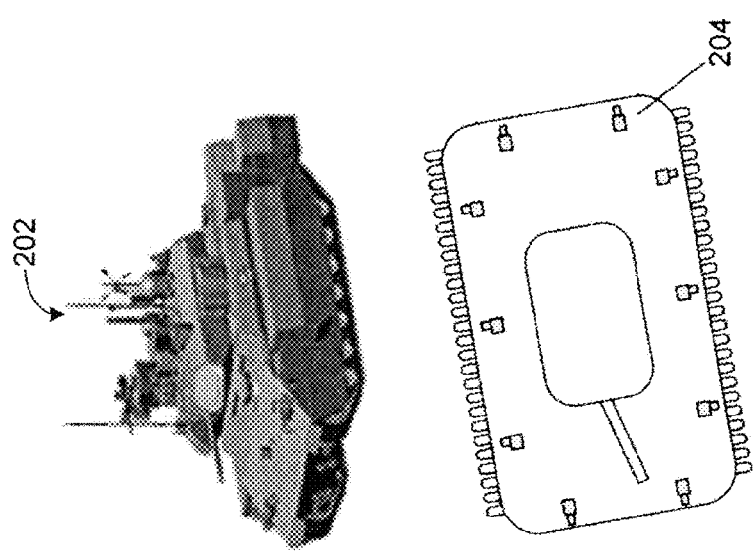
Fig. 10

SYSTEMS AND METHODS FOR IMAGE STREAM PROCESSING

RELATED APPLICATION

This application claims priority from and is a continuation-in-part of U.S. patent application Ser. No. 12/776,048, filed May 7, 2010, now issued as U.S. Pat. No. 8,266,333, which claims the benefit of U.S. Provisional Patent Application Ser. Nos. 61/182,624, filed May 29, 2009, and 61/234,577, filed Aug. 17, 2009. Each of the foregoing is hereby incorporated by reference herein.

TECHNICAL FIELD

The present invention relates generally to video and data stream processing, and more particularly, some embodiments relate to simultaneously processing multiple image streams with selectable algorithms in real time.

DESCRIPTION OF THE RELATED ART

Manned and unmanned vehicles, particularly those used by the military and security forces, are often equipped with a variety of sensors (e.g., image and audio capture devices) that provide a wide range of imagery and telemetry data to either the vehicle operator or other interested parties (e.g., a command and control center, such as a tactical operations center [TOC]). This is common for unmanned vehicles, such as unmanned aerial vehicles (UAVs), which are remotely operated under a broad range of conditions and are equipped with various sensor systems, such as a video camera, an infrared camera, and a synthetic aperture radar system, that allow for their remote operation under those range of conditions. Typically, data from different sensor sources of the UAV are displayed on different display devices within a ground control station where an operator controls the UAV. These data streams are typically transmitted from the UAV to the ground control station using a variety of protocols and formats according to the source sensor device and purpose of the data stream, and require the ground control station to devote separate resources to the separate data streams.

Another type of vehicle that is customarily equipped with a variety of sensors includes armored personnel carriers (APCs), which are generally utilized by military and security forces, come in a variety of configurations (e.g., manned or unmanned, tracked or wheeled), and often offer armor that protects against small arms fire, overhead bursts, and Nuclear, Biological, and Chemical (NBC) attacks. The design and purpose of the ground vehicle generally determines the amount of armor required. Though it is common for a manned armored vehicle to utilize bullet-resistant glass to provide vehicle occupants a view outside while protecting them exterior weapons fire, in certain situations, it may be preferable to construct the vehicle without windows in order to provide the vehicle and/or its occupants more protection. For example, a windowless vehicle design can potentially withstand greater impact, such as that resulting from improvised explosive devices (IED), or roadside bombs.

At times, vehicle designs that are windowless (or that rely less on windows as a means for vehicle operation) are a better choice when a vision system can provide visibility. For instance, the view through a window may offer limited visibility due to fog, or smoke, or airborne debris, and the window itself may be damaged or dirty due to environmental assaults. Helicopter brownouts are a common instance of this. During near-ground flight, and in particular during take-offs and landings in the dessert, helicopter rotor downwash can stir up intense, blinding dust clouds, which prevent pilots from seeing nearby objects which provide the outside visual references necessary to control the aircraft near the ground.

BRIEF SUMMARY OF EMBODIMENTS OF THE INVENTION

The present invention is directed toward a system and method for simultaneously switching multiple input image streams to multiple output devices while providing optional image processing functions on the image streams. The incoming image streams may come from computers, cameras, radar, or other image stream generating devices. The incoming streams may vary in resolution, frame rate, format, and protocol according to the characteristics and purpose of their respective source devices. The incoming image streams can be iteratively routed through a reconfigurable array of image processing circuit cards to operate on one or more streams using preprogrammed algorithms. A processed stream can be routed through another processing function, or to an output circuit card that sends the completed image to the external display, recording device, across a network, or to another logical destination.

For example, a system or method in accordance with the present invention may selectively and dynamically route one or more image input streams through one or more dynamically selectable and iterative algorithm processing elements (or modules) before the resulting processed streams are routed to one or more selectable outputs. For some embodiments, dynamic selectability with respect to inputs means that one or more inputs can be selected or unselected in real time for routing to one or more image processing elements. For additional embodiments, dynamic and iterative selectability with respect to processing elements means that a selected image stream can be routed to one or more image processing elements simultaneously and in real time. The routing may be based upon criteria relating to the image stream's source, the image stream's content, or on the preceding processing results of an image processing element. The output of an image processing element may be directed back to the system or method for routing to a subsequent image processing element, or to one or more image outputs that supply an image stream to an output device (e.g., display, image recorder, or other image processor, or transmission device).

According to various embodiments, a system for switching an image stream input to an image stream output is provided, comprising: an image stream input interface; an image stream output interface; a first image processing module, wherein the first image processing module is configured to accept an image stream from the image stream input interface or another image processing module, apply an image processing function to the image stream, and output a processed image stream; and a switching matrix, wherein the switching matrix is in communication with the image stream input interface, the image stream output interlace, and the first image processing module such that the switching matrix can selectively map (i.e., route) the image stream input interface to the image stream output interface or to the first image processing module, and the switching matrix can selectively map the processed image stream from the first image processing module to the image stream output interlace or to a second image processing module. For some embodiments, the system comprises a plurality of image processing modules, a plurality of image stream input interfaces, or a plurality of image stream output interfaces. An image stream may include both a steady flow of image frames (i.e., video) and image stills captured at a set interval (e.g., once every hour). Where a first image stream based on a second image stream is described herein, it would be understood that the first image stream may be identical to the second image stream or may be a derivative of the second image stream (e.g., the first image stream is the processed image stream produced by an image processing module that receives and processes the second image stream). For some embodiments, the system may be integrated into a display having a display output, wherein the image stream output interface is in communication with the display output.

For some embodiments, a system for image stream processing is provided where the first image processing module is configured to accept a plurality of image streams, stitch at least two image streams from the plurality of image streams into a contiguous image stream, and output the contiguous image stream. Depending on the embodiment, the first image processing module may perform the stitching at frame-level, The plurality of image streams may comprise an image stream from the image stream input interface or from another image processing module (e.g., the image stream of the image stream input interface after being processed by the second image processing module). The switching matrix may be configured to selectively map the image stream from the image stream input interface or from the second image processing module, to the first image processing module, and to selectively map the contiguous image stream from the first image processing module to the image stream output interface or to the second image processing module.

For certain embodiments, the system may comprise a plurality of image stream input interfaces, in communication with the switching matrix and including the image stream input interface, and at least two of the plurality of image streams may be based on a second plurality of image streams received through the plurality of image stream input interfaces. For example, some or all of the plurality of image streams (received by the first image processing module) may be based on a (second) plurality of image streams provided by a plurality of cameras that are placed in close proximity with respect to one another (e.g., adjacent to one another). In some such instances, the resulting contiguous image stream may provide a panoramic view from the vantage of the cameras.

It should be understood that where one or more image streams of the plurality of image streams are based on the second plurality of image streams, those one or more image streams may be the processed image streams that result from the second plurality of image streams being processed by one or more image processing modules. Additionally, to receive the plurality of image streams from the plurality of cameras, the system may further comprise a plurality of image stream input interfaces, which are in communication with the switching matrix and which are communicatively coupled to the plurality of cameras.

The switching matrix may be configured to adjust the selective mapping such that in real time, a particular image stream is added to or removed from the plurality of image streams being accepted by the first image processing module. For example, where the contiguous image stream is providing a panoramic view generated from multiple camera image streams, a user request to pan the view in particular direction (e.g., left, right, up, or down) may cause the switching matrix to adjust the image streams mapped to the first image processing module such that camera image stream(s) providing to the user requested view are added to the plurality of image streams being mapped to the first image processing module, and those cameras image stream(s) no longer contributing to/relevant to the user requested view are removed from the plurality of image streams being mapped to the first image processing module. In adding and removing particular camera image stream(s), various embodiments may adjust the panoramic view (i.e., the contiguous image stream) that is produced by the first image processing module. Such adjustments may, for example, be utilized in embodiments where the contiguous image stream provides a panoramic view (e.g., in an occupant cabin of a vehicle) created by multiple adjacently placed cameras (e.g., providing an external view from the vehicle).

In accordance with various embodiments, the contiguous image stream produced by the first image processing module may comprise a set of image streams that have been processed by one or more image processing modules before being stitched into the contiguous image stream. With some such embodiments, a contiguous image stream comprising a mosaic of image streams can be generated, with each image stream possibly having a different set of image functions (e.g., enhancement, filter, etc.) being applied. For example, where the contiguous image stream is a panoramic view comprising a set of image streams (e.g., from a camera) stitched in a 3 by 3 arrangement, the image stream in the center may be unprocessed while the outer image streams may be processed for enhancement (e.g., terrain awareness warning [TAWS], targeting, overlaying telemetry data).

Various embodiments provide for a vehicle vision system, comprising: a plurality of image capture devices coupled to a vehicle; a plurality of image stream input interfaces coupled to the plurality of image capture devices; an image stream output interface; a first image processing module; a second image processing module; and a switching matrix, where the first image processing module is configured to accept a plurality of image streams, stitch at least two image streams from the plurality of image streams into a contiguous image stream, and output the contiguous image stream, and where the plurality of image streams comprises an image stream from at least one of the plurality of image stream input interfaces or from another image processing module. The switching matrix may be in communication with the plurality of image stream input interfaces, the image stream output interface, the first image processing module, and the second image processing module, such that the switching matrix can selectively map the image stream from the at least one of the plurality of image stream input interfaces or from the second image processing module, to the first image processing module, and can selectively map the contiguous image stream from the first image processing module to the image stream output interface or to the second image processing module.

As discussed herein, the resulting contiguous image stream may provide a panoramic view from the vantage of the plurality of image capture devices (e.g., a video camera, an infrared camera, or an x-ray camera). Vehicles in which various embodiments may be utilized include, for example, ground vehicles (e.g., APCs, tanks, and other armored vehicles), aircraft, watercraft (e.g., submergible vehicles), and spacecraft. Various embodiments may be particularly useful for vehicles that carry occupants but are configured to be windowless (e.g., armored vehicles, which can provide more protection to its occupant by being windowless). Where occupants of a vehicle are utilizing an embodiment (e.g., driver of a windowless vehicle is using the system to operate the vehicle), one or more of the image stream output interfaces of the vehicle vision system may be coupled to a display device disposed in a passenger cabin of the vehicle.

According to certain embodiments, the vehicle vision system of a first vehicle may be coupled to another vehicle vision system (e.g., via a network connection) disposed in the same first vehicle or disposed in another (e.g., a second) vehicle, and configured to transmit a shared image stream from the vehicle vision system to the other vehicle vision system. Additionally, depending on the embodiment, the shared image stream may comprise at least an image stream from at least one of the plurality of image stream input interfaces, the contiguous image stream, or a processed image stream outputted by the second image processing module. By implementing shared image streams, various embodiments may enable a group of two or more vehicles share views from their respective vantage points, which may be particularly useful for a group of vehicles traveling in a convoy. For example, a group of vehicles traveling in a convoy may utilize an embodiment configured to provide some or all of the vehicles in the group with a panoramic view from the vantage of the entire column (e.g., a contiguous image stream comprising image streams from the external view cameras of vehicles on the outer-most perimeter of the convoy).

According to some embodiments, a system for image processing is provided comprising: an image stream input interface; an image stream output interface; a first image processing module; a second image processing module; and a switching matrix, where the first image processing module is configured to accept an image stream from the image stream input interlace or another image processing module, crop the image stream (e.g., crop based on a user selection of one or more portions of the image stream), and output a cropped image stream. The switching matrix may be in communication with the image stream input interface, the image stream output interface, the first image processing module, and the second image processing module, such that the switching matrix can selectively map the image stream from the image stream input interface to the image stream output interface or to the first image processing module, and selectively map the cropped image stream from the first image processing module to the image stream output interface or to the second image processing module.

In some embodiments, a user may select one or more portions of a given image stream as Area(s) of Interest (AOIs) such that those selected portions (i.e., AOIs) are cropped from the given image stream and subsequently processed and/or outputted by the embodiments. In environments where user-selected AOIs from a given image stream are to be transmitted to remote recipients (e.g., from a vehicle to a command and control center) over a network connection, certain embodiments may enable intelligent encoding (e.g., compression) and transmission of those AOIs to the exclusion of the remainder of the given image stream, thereby implementing efficient bandwidth use of the network connection.

According to certain embodiments, a system for image processing is provided comprising: an image stream input interface; an image stream output interface; a first image processing module; a second image processing module; and a switching matrix, where the first image processing module is configured to accept an image stream from the image stream input interface or from another image processing module, and determine a set of differences between a plurality of frames in the image stream. As described herein, the switching matrix may be in communication with the image stream input interface, the image stream output interface, the first image processing module, and the second image processing module, such that the switching matrix can selectively map the image stream from the image stream input interface to the image stream output interface or to the first image processing module, and selectively map the image stream from the first image processing module to the image stream output interface or to the second image processing module.

Depending on the embodiment, determining the set of differences may be facilitated through a frame-differencing algorithm, which may be configured movement detection in the image stream. Additionally, the set of differences generated by an embodiment may comprise differences based on to pixel colors or frame histogram. For some embodiments, the set of differences may be stored on a data storage device, and the image stream may be recorded to the data storage devices, such that the set of difference comprises a set of references to time indexes in the recorded image stream.

In some embodiments, the image processing module is a field programmable gate array (FPGA) to which algorithms, such as image processing functions, can be programmed and changed if desired. Additionally, with the use of multiple image processing functions, algorithms, such as image processing functions, can be executed in a predetermined or adaptive sequence. Example algorithms include convolutions, real-time adaptive histograms, and algorithms capable of processing multiple frames simultaneously (e.g., image subtraction function).

After reading this description, one of ordinary skill in the art would understand that, depending on the embodiment, either the image stream input interlace, the image stream output interface, or both may utilize unidirectional communication or bidirectional communication with input devices and output devices. For example, a system may be configured to receive control information from a controller interface device via an image stream output interface, or to send control information to an image source via an image stream input interface. In another example, the control information is received by the system through the Display Data Channel (DDC). Depending on the embodiment, the system may be configured to send control information to a device external to the system, through the image stream input interface.

In some embodiments, the switching matrix may selectively map an image stream input interface or a processed image stream in real-time. In further embodiments, the switching matrix may selectively map the image stream input interface to more than one image processing module or to more than one image stream output interface simultaneously. Additionally, in some embodiments, the switching matrix may selectively map the processed image stream to more than one image processing module or to more than one image stream output interface simultaneously. In other embodiments, the switching matrix may selectively map an image stream input interface or the processed image stream based on a criterion. For example, the switching matrix may selectively map an image stream input interface or a processed image stream based on its source or content. In another example, the switching matrix may selectively map a processed image stream based on the preceding results of an image processing module. Depending on the embodiment, the image processing module may have the capability of processing a plurality of image streams in parallel.

The image stream input interface for some embodiments may be configured to receive the image stream from an image capture device (capable of capturing an image stream), an image stream playback device, a computer system, or a sensor device (e.g., sensors typically found on an aircraft, such as a radar system). The image stream output interface for some embodiments may be configured to output to a display (e.g., liquid crystal display monitor), a computer system, or recording device (e.g., digital video recorder). Further, in some embodiments, the system may be configured to output an image stream through a virtual display.

In numerous embodiments, the system further comprises a data input interface, wherein the switching matrix is further in communication with the data input interface such that the switching matrix can further selectively map the data input interface to the image stream output interface or to the first image processing module. For some such embodiments, the image stream input interface may comprise the data input interface.

With respect to protocols and interface types, in various embodiments, the image stream input interface or image stream output interface has a Digital Video Interface (DVI) connector, High-definition Multimedia Interface (HDMI) connector, a Bayonet Neill-Concelman (BNC) connector, a fiber optic connector, a DisplayPort connector, a Universal Serial Bus (USB) connector, or a Firewire (IEEE1394) connector. In regard to formats, the image stream input interface is configured to convert from or the image stream output interface is configured to: a Digital Video Interface (DVI) standard (e.g., DVI-D digital mode, DVI-A analog mode), a High-definition Multimedia Interface (HDMI) compatible standard, a Red-Green-Blue (RGB) Analog standard, a Red-Green-Blue (RGB) Digital standard, a DisplayPort standard, a National Television System Committee (NTSC) standard, a Phase Alternate Line (PAL) standard, or a Serial Digital Interface (SDI) standard.

The image processing function in some embodiments may comprise an image stream mix function, an image stream scale function, an image stream blend function, an image stream encoding function (e.g., video or audio compression, such as H.264), an image stream enhancement function, or image stream cropping function. For those embodiments having an image stream enhancement function, the image stream enhancement function may comprise a de-haze function, a de-blur function, a shadow function, a dawn-dusk function, a fusion function, a (motion) stabilization function, a thermal turbulence function, an equalization function, an edge detection function, a rain and fog function, or a light optimizing function. Further, in some embodiments, the system can eliminate or reduce frame latency by configuring an image processing module to apply processing results of a given frame to a subsequent frame. With respect to image stream enhancement functions, various embodiments may include overlaying an image stream with visual and textual information (e.g., targeting reticles, telemetry data or visual indicators, etc.), which could be useful to those receiving the information (e.g., driver of a ground vehicle or remote operator of a UAV).

In additional embodiments, the image processing function can enhance the image stream for detecting texture differences. For example, a light optimizing function may be utilized in adjusting a color channel for the image stream in order to detect certain objects in the image stream. The system may apply image processing functions in real time to image feeds from a camera in order to detect differences in objects, detect anomalies, determine boundaries of objects (e.g., based on color change or pixel change), and identify reference locations for subsequent registration of images from other modalities.

With respect to the last image processing function just discussed, image registration is the process of determining the alignment between two images that have overlapping regions, where the images may be acquired at different times and/or by different sensors. The difficulty in aligning such images is further increased during multi-modal image registration, where the images are acquired using different imaging techniques (e.g., two images that share similar content may have very different intensity mappings).

In some embodiments, algorithms such as edge detection, sum of squared differences (SSD) and Fast Fourier Transform (FFT) are programmed into the image processing module such that multi-modal registration of images, such as from multiple image capture modalities (e.g., infra-red and x-ray cameras), can be achieved. Sum of squared differences (SSD) is a common metric used for judging image similarity by a weighted sum of squared differences (SSD) cost function. The evaluation of the SSD cost function can be performed efficiently using the Fast Fourier Transform (FFT) to determine the optimal translation between two images based on pixel intensities.

In some embodiments, the image stream enhancement function performed by the image processing module comprises an auto-focus function capable of adjusting focus of an image capture device that is coupled to the image stream input interface and producing the image stream. For example the auto-focus function may comprise the operations of: performing an edge detection algorithm on the image stream, thereby producing the processed image stream; and generating focus instructions for the image capture device based on the processed image stream. In further such embodiments, the operations of the auto-focus function are repeated iteratively until the image capture device is in-focus. In other embodiments, the edge enhancement algorithm utilizes a Laplacian convolution.

In certain embodiments, the system further comprises a control interface through which a user may operate or configure the system, among other things (e.g., check status of the system). For some such embodiments, the control interface may comprise a display touch panel having a graphical user interface, a keyboard, or a mouse, which are all examples of human machine interfaces (HMIs). For particular embodiments where the image stream output interface is outputting to a computer system, the control interface may be directly connected to the system and not connected to the computer system.

In some embodiments, the system can detect what type of image stream input interface, image stream output interface, or image processing module is present in the system, and configure the system according to the type. Further, in some embodiments, the system can detect what type of image stream input interface, image stream output interface, or image processing module is present in the system, and configure the control interface according to the type. For example, the system may detect the types of circuit cards present in each card slot of its chassis, self-configure the mix of image input cards, image processing cards, and image output cards detected, and present to the user a visual representation interface according to the mix for the purpose of providing image routing choices. It should be noted that in some embodiments the control interface comprises virtual buttons.

Additional embodiments provide for methods for switching an image stream input to an image stream output. In particular, one such method comprises: receiving an image stream through an image stream input interface; using a switching matrix to selectively map the image stream to: a first image processing module, wherein the first image processing module is configured to accept the image stream from the image stream input interface or another image processing module, apply an image processing function to the image stream, and output a processed image stream to an image stream output interface. For some such embodiments, if the switching matrix selectively maps the image stream to the first image processing module, the first image processing module may perform the operations of: receiving the image stream from the image stream input interface or another image processing module; applying the image processing function to the image stream; and outputting the processed image stream. Furthermore, for some such embodiments, if the switching matrix selectively maps the image stream to the first image processing module, the switching matrix may selectively map the processed image stream to a second image processing module or to the image stream output interlace.

Other embodiments provide for a computer readable storage medium having instructions embedded thereon to cause a processor to perform operations similar to those described above with respect to the various systems and methods in accordance with the present invention.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 1B illustrates an exemplary system process of an embodiment of the invention.

FIG. 10 illustrates an armored vehicle environment in which an exemplary system can be implemented in accordance according with an embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1A:
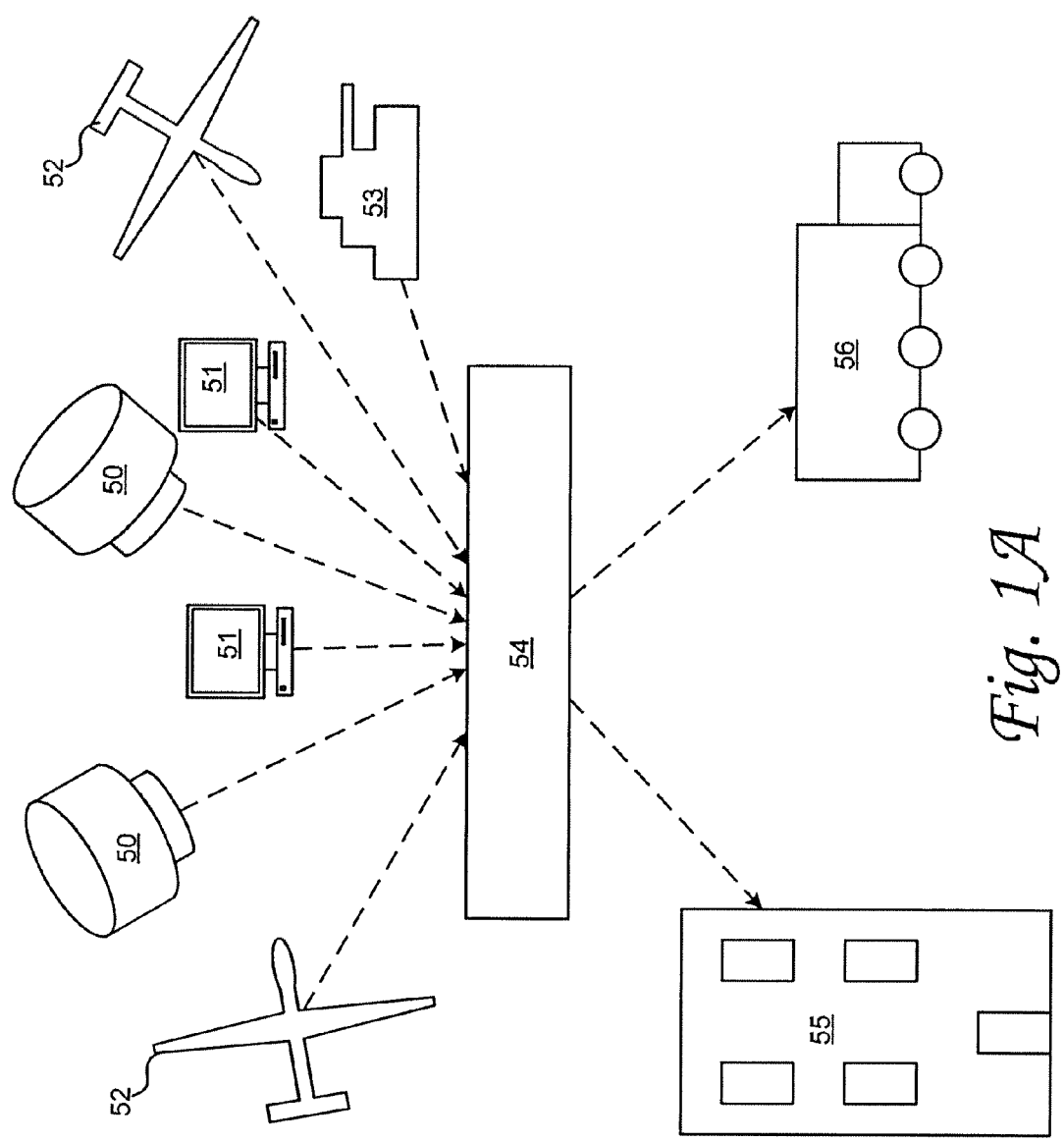
FIG. 1A illustrates an exemplary environment in which an embodiment of the invention might be employed.

Before describing the invention in detail, it is useful to describe an exemplary environment with which the invention can be implemented. One such example is that of a military operation, an example of which is shown in FIG. 1A. Video feeds and other data are processed and relayed by a system 54 to one or more destinations 55 and 56. For example, the video feeds and other data may comprise satellite imagery feeds transmitted by satellite 50; airborne sources of information such as live video or radar feeds from aircraft, such as unmanned aerial vehicles (UAVs) 52 or a manned surveillance aircraft (not shown); ground-based information, such as imagery from ground vehicle 53; or any other video or data feed, such as prerecorded video of terrain stored in computers 51 for use in providing contextual information for a live video stream. In this environment, the data from the various data sources are combined in system 54 and relayed to destinations 55 and 56. For example, destination 55 might comprise a headquarters that is overseeing the military operation and destination 56 may comprise a mobile operations center in charge of coordinating the operation or a portion of the operation. For example, mobile operations center 56 may comprise a UAV operations center charged with piloting the UAVs 52. In many implementations, destinations 55 and 56 may contain a plurality of different devices to receive incoming data, such as multiple displays, storage devices, or satellite transmitters. Moreover, various personnel may desire access to all or a portion of the available data. Accordingly, system 54 may be configured to selectively transmit different portions of the data to the various displays according to the needs of the personnel.

FIG. 1B illustrates an exemplary system process of an embodiment of the invention deployed in the environment of FIG. 1A. A plurality of input devices, such as computers 62 and 61, storage devices 60, and sensor devices 58 and 59 transmit a corresponding plurality of image feeds to the system 67. For example, the image feeds might comprise satellite imagery 63, high-altitude terrain imagery 64, prerecorded terrain imagery 65, or an infrared video feed 66. The image feeds are then transmitted to the system 67 for processing and routing to a variety of output devices. A matrix switch 68 allows the image feeds to be directly routed to the output devices or to be routed through one or more image processing or other functional modules. For example, a system might comprise a dedicated subsystem of image processing modules 69 to perform mixing, scaling, blending functions, and image enhancement functions. In some embodiments, the most common image processing functions may be performed on a dedicated subsystem 69. In the embodiment illustrated in FIG. 1B, these are mixing multiple image streams together, for example to create a virtual display 74; scaling image streams, for example interpolating an image to increase image resolution for comfortable viewing on a larger screen; and blending image streams, for example to overlay one image stream on top of another. In these embodiments, configurable or interchangeable functions may be performed on a second subsystem 70. Such functions might comprise image enhancement functions as image stabilization, image de-blurring, image de-hazing, dawn/dusk compensation, temporal blending, image or sensor fusion algorithms, or edge detection, or such functions as video encoding or compression algorithms such as an H.264 encoding algorithm. The processed image streams may be routed to an output device, or rerouted through another functional module. For example, a composite image stream could be formed by performing a sensor fusion algorithm on an infrared video stream and an optical video stream, then the composite image stream could be routed through an encoding module to form an encoded composite image streams for storage on a video storage device. A variety of different output devices may be used with embodiments of the invention, such as video displays 73, virtual display 74 comprising one or more mixed or overlaid image streams, or video storage device 71.

Further image enhancement functions can also include an auto-focus function configured to adjust the focus of an input device coupled to the system 67 based on the image feed provided by the input device. For example, according to one embodiment, the auto-focus function within an image processing module 69 could adjust the focus of an input device by first receiving an image feed from the input device, performing an edge detection algorithm on the image feed, and then producing a processed image feed that would enable easier detection of an edge. Next, based on the processed image feed, the auto-focus function would generate a focus instruction for the input device. Once the focus instructions have been implemented by the input device, the process may iteratively repeat until the input device comes into focus. In other words, the new image feed provided by the now adjusted input device would be provided to the auto-focus function, the auto-focus function would perform edge detection on the new image feed, and the auto-focus function would, if necessary, generate additional focus instructions for the input device to implement based on the new processed image feed. Optionally, the auto-focus function may utilize a Laplacian convolution in its edge detection algorithm.

From time-to-time, the present invention is described herein in terms of this exemplary environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Figure 2A:
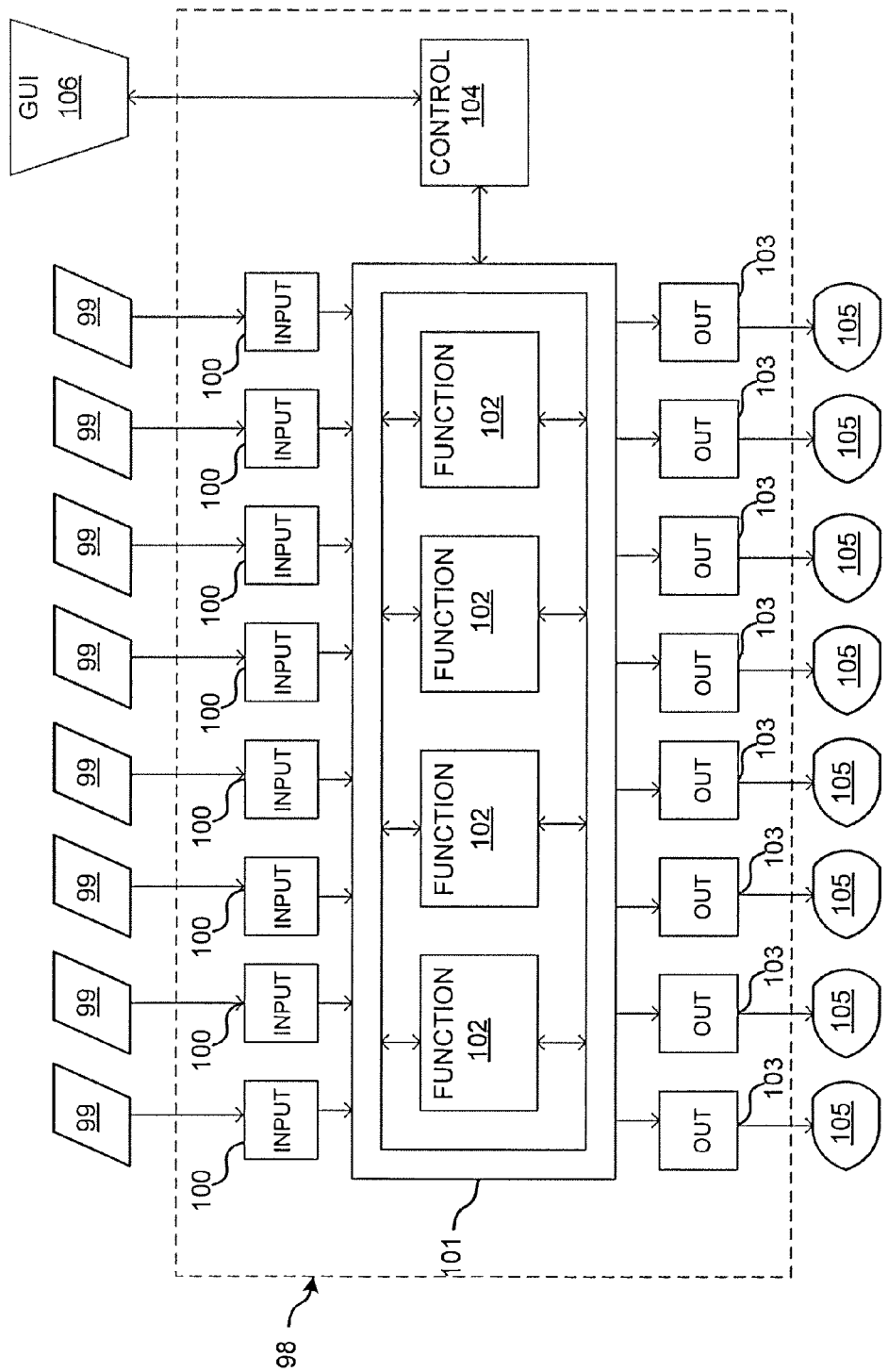
FIG. 2A illustrates an exemplary configurable system for simultaneously processing multiple data streams according to an embodiment of the invention.

FIG. 2A illustrates an exemplary configurable system for simultaneously processing multiple data streams according to an embodiment of the invention. A plurality of data sources 99 are coupled to the system 98 by way of a plurality of input modules 100. The plurality of data sources 99 transmit a corresponding plurality of data streams to the system 98. Depending on the type of data source, these data streams may vary in resolution, frame rate, format, and protocol. For example, a helmet mounted camera may transmit a low resolution and low frame rate image stream to the system 98 that is both compressed and encoded; a UAV-mounted camera may provide an encoded high resolution and high frame rate image stream; and a computer may provide a static or slowly varying chroma mask for inserting information into a displayed image stream. Accordingly, in this embodiment, the input modules 100 are configured to receive these different data streams and convert them to a common format for use in system 98. For example, inputs 100 may convert the image streams to an uncompressed 30 frame per second video feed comprising four differential signals (red, green, blue, and clock signals) according to the Digital Video Interface (DVI) standard.

In additional embodiments, inputs 100 may convert the images streams to other standards, such as a High-definition Multimedia Interface (HDMI) standard, a Red-Green-Blue (RGB) Digital standard, a Red-Green-Blue (RGB) Analog standard, a DisplayPort standard, a National Television System Committee (NTSC) standard, a Phase Alternate Line (PAL) standard, Serial Digital Interface (SDI) standard. Accordingly, various embodiments may have inputs 100 further configured with a variety of connector types, thereby enabling system 98 to accept image streams based on different protocols, formats, and standards. For example, some of those connector types include Digital Video Interface (DVI), High-definition Multimedia Interface (HDMI), Bayonet Neill-Concelman (BNC), fiber optic, DisplayPort, Universal Serial Bus (USB), and Firewire (IEEE1394).

Continuing with the illustrated embodiment, input modules 100 are coupled to a switch fabric 101 that allows the converted image streams to be routed to any of the output modules 103 or function modules 102. For example, switch fabric 101 may comprise a crossbar switch or crossover switch matrix. The embodiment further comprises a control module 104 in communication with a graphical user interface (GUI) 106 and the switch fabric 101. In this embodiment, the control module 104 is in electrical communication with the switch fabric 101 to allow the routing configuration of the switch fabric 101 to be controlled. The GUI 106 interlaces with the control module 104 to allow the system user to control which image streams are subject to which image processing functions and where those image streams are eventually displayed. For example, the GUI 106 might comprise a touch screen interface displaying a graphical representation of the system that is configured to allow a user to control the image stream routing and processing through tactile commands. In this example, the control module 104 may interface with the GUI 106 and translate the graphical manipulations performed at the GUI 106 to the corresponding electrical signals necessary to reconfigure the switch fabric 101 to conform to the user's desired routing and processing configuration.

In this embodiment, the switch fabric 101 is in further communication with a plurality of functional image processing modules 102 and a plurality of output modules 103. A functional image processing module 102 is configured to receive one or more image streams via the switch fabric 101, to perform a predetermined function on the received image streams, and output the results as one or more image streams back into the switch fabric 101. In some embodiments, the output of the image processing modules 102 is configured to be compatible with the output of input modules 100. Accordingly, image streams that are output from a first function 102 can be utilized as input streams for a second function 102, and so on. For example, live video from a UAV can be combined with a synthetic aperture radar (SAR) data stream for use in de-hazing the live video stream and a de-hazed live video stream may be provided to an edge detecting functional module to provide a de-hazed and edge detected video stream to a display 105.

Output modules 103 are configured to receive the data streams from the switch fabric 101 and to format them for display on a plurality of display devices 105. For example, one of the output modules 103 may receive an uncompressed video stream from the switch fabric 101 and format it to be compressed and encoded for transmission to a display device 105 situated in a remotely located headquarters. As another example, the GUI 106 may be integrated into one or more of the display devices 105 such that use of the control module 104 comprises manipulating an image displayed on the display device 105 to perform sensor fusion. For example, a user may use a touch display to drag an infrared video stream onto a SAR data stream combining the infrared video stream with the SAR data stream through a sensor fusion algorithm. The GUI 106 then causes the control module 104 to route the infrared video stream and the SAR data stream onto a fusion functional module 102 to display a combined infrared/SAR video stream on the display device 105.

It should be noted that, in addition to military applications, the various systems and methods in accordance with the present invention are also particularly useful in the medical field. Specifically, various embodiments of the invention can be utilized with medical imaging devices, where image streams provided by medical imaging devices can be processed or enhanced for analysis purposes. For example, an endoscope may be used in conjunction with a system in accordance with one embodiment, whereby the system receives an image stream from the endoscope, the system maps the image stream to an image processing module that applies light optimizing functions to the image stream, and the system outputs the results from the image processing module to an output module for display. By doing so, the image stream from the endoscope is enhanced for polyp detection. The light optimizing function may adjust a specific color channel (e.g., red, green, blue) for the image stream, or may adjust the color within a predetermined wavelength range for the image stream (e.g., a predetermined range centered around 10% of the center wavelength). In some embodiments, a graphical user interface may be displayed on the output device in conjunction with the output image stream to enable a system user to modify various parameters of the image processing module. For instance, a user may be able to select a color channel for the displayed image stream and be able to modify the color channel according to user preferences. For example, a user may desire to modify a red channel of the color stream to increase the red channel contrast and modify the red channel tint.

Figure 2B:
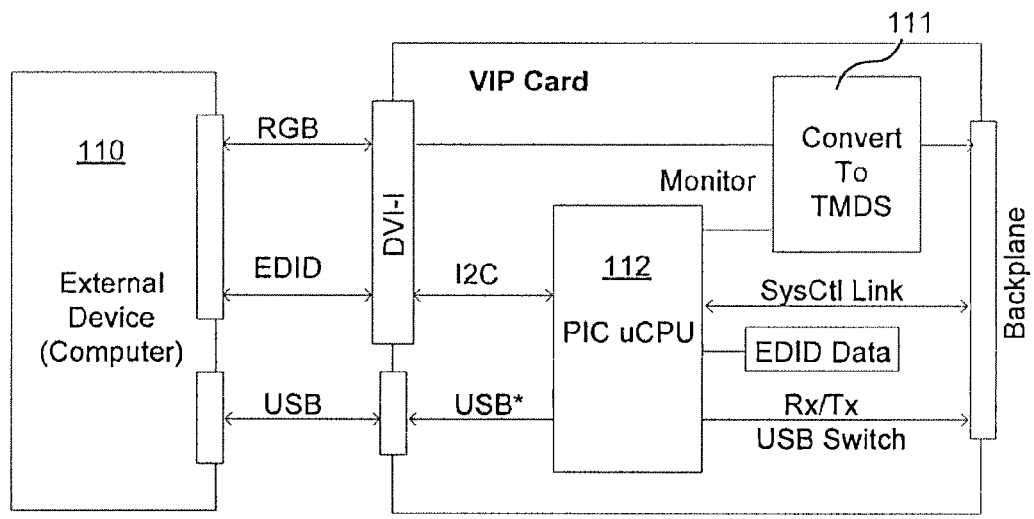
FIG. 2B illustrates an exemplary video input module according to an embodiment of the invention.

FIG. 2B illustrates an exemplary video input module according to an embodiment of the invention. As described herein, data sources used in various embodiments of the invention may be configured using different protocols and formats. For example, an external device 110, such as a computer, may be configured to wirelessly receive and decode radio transmitted video signals and provide them in an analog format according to the DVI-I protocol. The analog signal is transmitted to the conversion module 111 for conversion to a digital standard, such as TMDS. The digitally converted signal is then provided to the switch fabric 101, as described herein. A control module 112 is provided to implement system control functions. For example, the control module 112 may be configured to monitor the conversion module 111 for reporting to the system wide control module, such as module 104 described with respect to FIG. 2A. The control module 112 may be further configured to interface with the external devices, for example through a digital data control channel or a USB interface. For example, some data sources may be devices that are controllable, such as a remote sensor configured to controllably alter its field of view. Accordingly, in addition to receiving data from them, some embodiments may be equipped with the ability to transfer commands and information to the data sources.

Figure 2C:
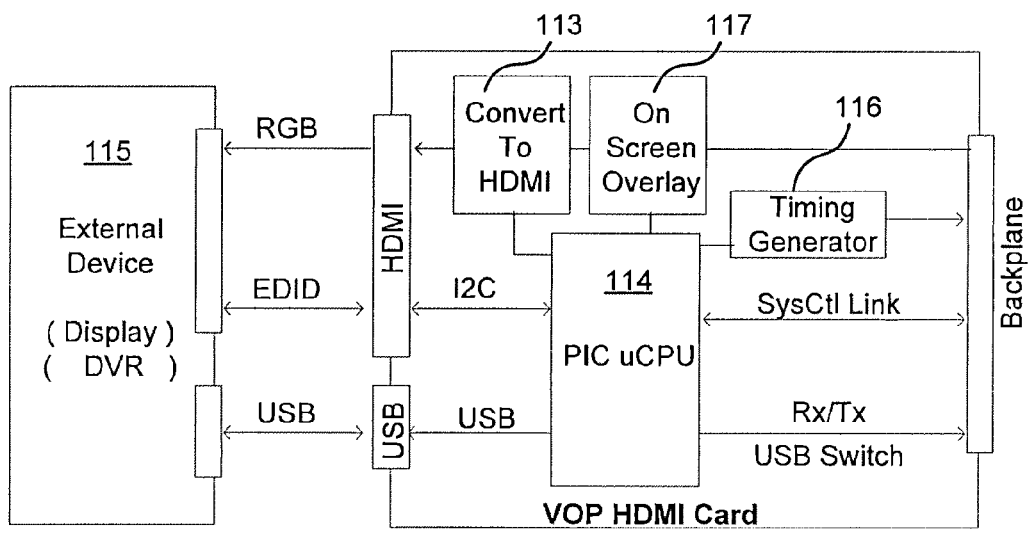
FIG. 2C illustrates an exemplary video output module according to an embodiment of the invention.

FIG. 2C illustrates a video output module according to an embodiment of the invention. As with the input devices, a variety of output devices may interface with the system according to various embodiments of the invention. For example, output devices may comprise radio transmission links, video displays, or recording devices. Accordingly, to interface with these various output devices, a video output module may comprise a conversion module 113 configured to convert the signal received from the switch fabric 101 to an appropriate format for the particular output device 115 coupled to the video output module. A video output control module 114 may also be provided to implement various other functions. For example, control module 114 may monitor the conversion module 113 for reporting to the system wide control module. The control module 114 may also receive display ID information from the external device 115 and provide that information to the system wide control module. In some embodiments, the output device 115 may have particular timing requirements, so the video output module may be further provided with a timing generator module 116 that provides the timing channel for the DVI-D link under the immediate control of the control module 114 and under general control by the system wide control module. For example, timing generator module 116 may generate a timing channel and provide it to a blending and mixing functional module 102 so that multiple asynchronous image streams may be synchronized for image combination and display on output device 115. Additionally, in systems configured to receive information from output devices, the control module 114 may be configured to relay that information to the system. For example, some embodiments may utilize a USB 2.0 communications protocol to allow the output device 115 to transmit data and control information to other devices in communication with the system. In a particular embodiment, some of the other devices in communication with the system are configured for full duplex communications, so to implement USB-based communications, the control module 114 converts the half-duplex USB 2.0 to a full duplex.

Figure 2D:
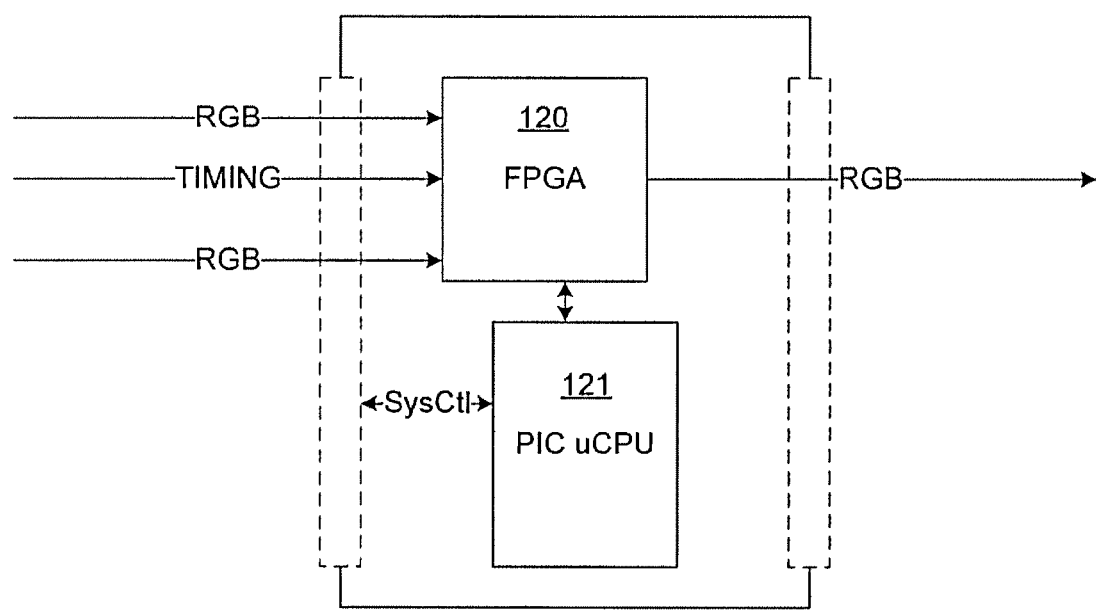
FIG. 2D illustrates an exemplary functional image processing module according to an embodiment of the invention.

FIG. 2D illustrates an exemplary functional image processing module according to an embodiment of the invention. A function module 120 is provided to receive one or more input video streams from the switch fabric 101 and to perform image processing algorithms upon them. The processed video streams are output back onto the switch fabric 101 for use as an input in another function module or transmission to an output device. Additionally, a timing signal, for example as generated by a video output module described with respect to FIG. 2C, may be received by the function module 120 for synchronization and timing formatting. For example, such a timing signal may be used for chromakey-based mixing of two incoming video signals. A control module 121 is further provided to implement system control functions. For example, the control module 121 may be configured to monitor the operations of the function module 120 for reporting to the system wide control module. In some embodiments, the function module 120 may be configured to implement one of a plurality of image processing algorithms, and the choice of algorithm may be controlled by the control module 121 under command from the system wide control. Additionally, some function modules may be configured to download and receive new image processing algorithms. These new algorithms may be transmitted through the system control link and programmed into the function module 120 by the control module 121.

Figure 2E:
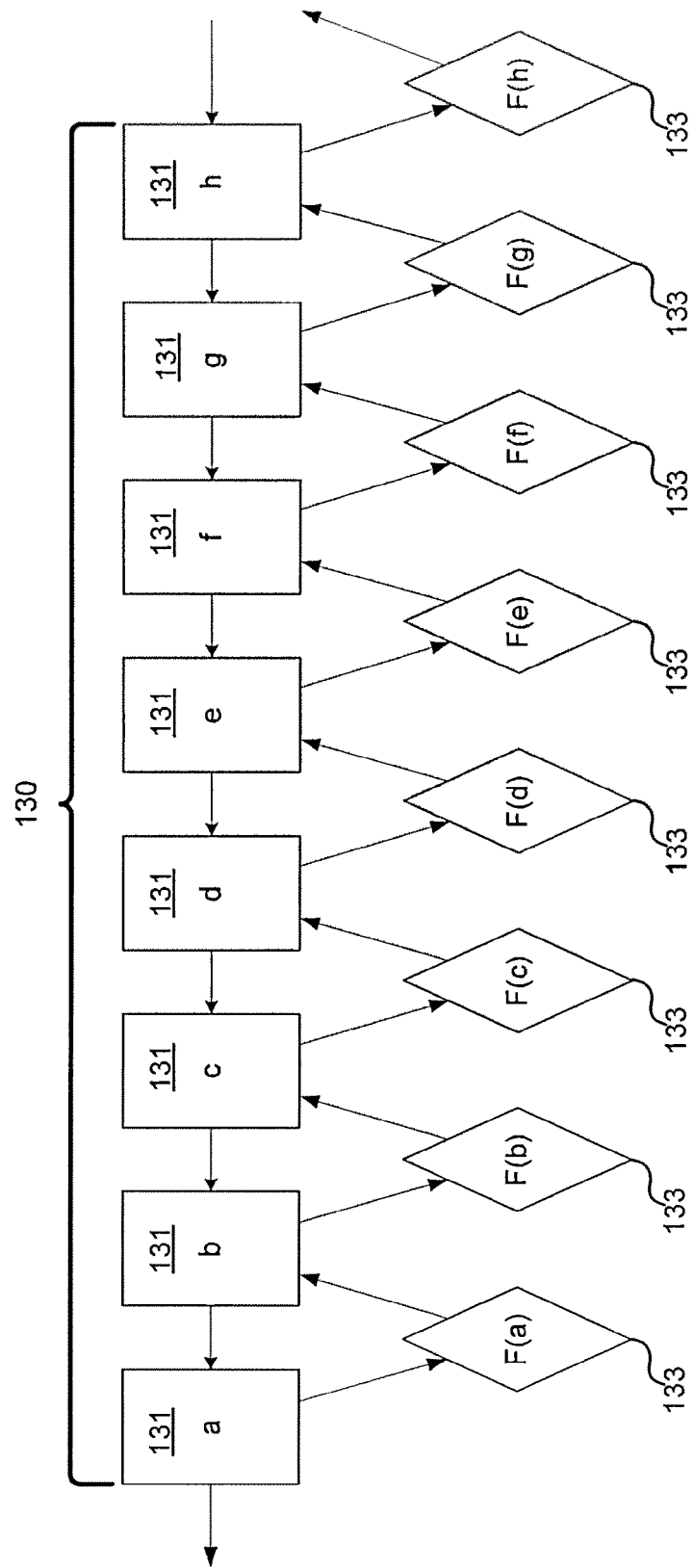
FIG. 2E illustrates an exemplary method of image processing performed by a functional image processing module according to an embodiment of the invention.

FIG. 2E illustrates a general method for image processing according to an embodiment of the invention. Image stream 130 comprises a plurality of frames 131 transmitted at particular time intervals, such as 30 frames per second. In many cases, image stream 130 is unlikely to vary considerably from frame to frame, i.e. frame b is likely to be very similar to frame a, frame c will likely be very similar to frame b, and so on. Accordingly, latency may be avoided or reduced by applying the results of a processing function on a given frame to a subsequent frame. For example in FIG. 2E, the function 133 is computed for each frame and the results are applied to the next frame, i.e. F(a), the results of the function applied to frame a, are applied to frame b; F(b) is applied to frame c, and so on. In some embodiments, this method may be employed when the time it takes function module 120 to process a single image frame may be less than or equal to the time that image frame is displayed. In other embodiments, the results of a function performed on a frame may be applied to a plurality of following frames, or a frame that follows after a number of intervening frames. For example, the results of the function might be applied to the following three frames and the results function itself may be computed for every third frame. This method might be employed, for example, when computational requirements are larger and frame computations cannot be performed in parallel. As another example, the function may be computed for each frame as before, but the results of the computation might be applied to the fourth frame following the argument of the function. In other words, F(a) may be applied to frame d, F(b) may be applied to frame e, and so on. This method might be employed, for example, when computational time is longer than the time it takes each frame to be displayed but simultaneous frame computations may be performed. In other embodiments, these methods may be combined or implemented together and some latency may be tolerated according to environment-specific variables such as the image stream rate of change, the image stream frame rate, and the image processing function or functions being performed on the image stream.

Figure 3A:
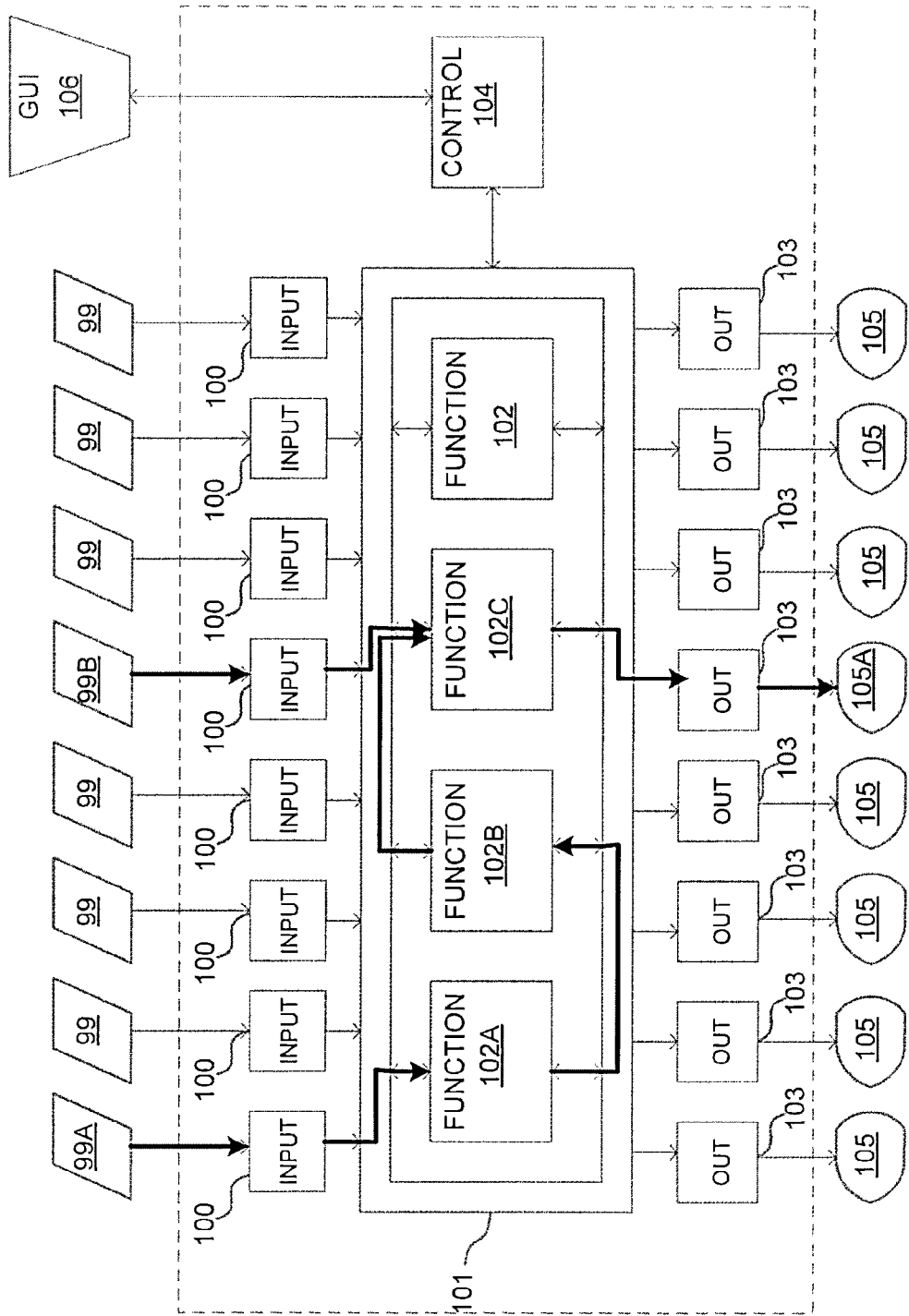
FIG. 3A illustrates an example of iterative image processing according to an embodiment of the invention.
Figure 3B:
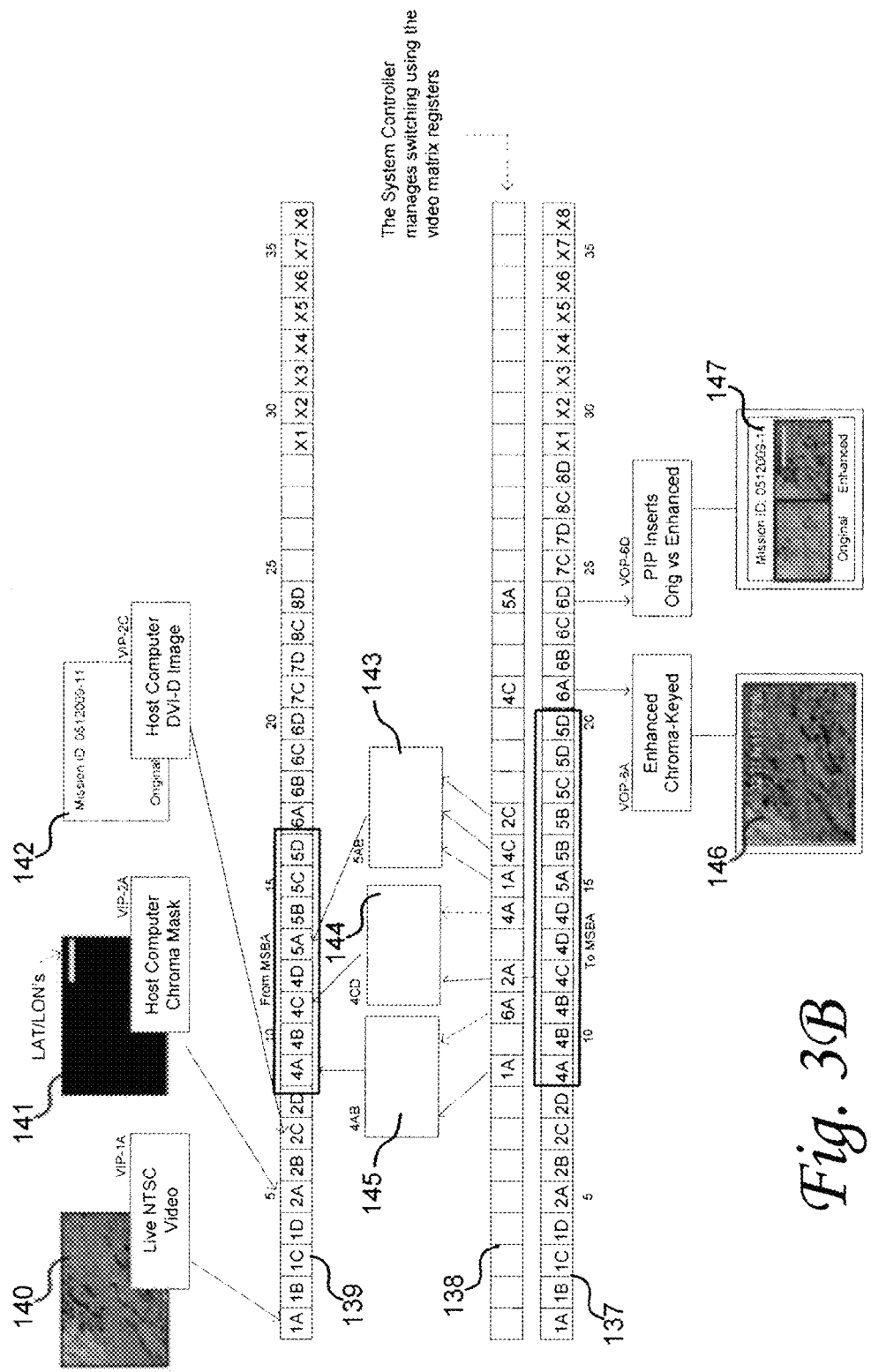
FIG. 3B illustrates an exemplary switch fabric implementation of iterative image processing according to a particular embodiment of the invention.

FIG. 3A illustrates an example of a routing process, where the data stream from data source 99A is routed through functional modules 102A. 102B, and 102C in that order, and then combined with the data stream from data source 99B to be displayed on display device 105A. FIG. 3B illustrates another example of a routing process, implemented on a fabric matrix switch in a system where image streams comprise four differential signal pairs, such as TMDS standard signals. In this example, the fabric matrix switch card may comprise a switch fabric having 144 addressable inputs (input interfaces) and 144 addressable outputs (output interfaces). The inputs and outputs may be further portioned into 36 addressed input ports and 36 addressed output ports, each port comprising four inputs or outputs corresponding to the four differential signal pairs of the image streams. In FIG. 3B, array 139 represents the addressed input ports, array 137 represents the addressed output ports, and array 138 represents the mappings from the input ports to the output ports.

In this example, an analog video feed 140 is converted to a digital standard and provided to the system on input port 1A. Chroma mask 141 comprising latitude and longitude coordinates is provided to the system on input port 2A. A mission ID image is further provided to the system on input port 2C. Port 1A is mapped to output ports 4A and 5A. Output port 4A outputs to module functional 145, which enhances the received feed 140 and provides the enhanced feed to input port 4A. Input port 4A is mapped to output port 4D, which outputs to functional module 144. Input port 2A is mapped to output port 4C, which also outputs functional module 144. Accordingly, functional module 144 applies chroma key image combination to the enhanced feed and the chroma mask to provide an enhanced and coordinate-overlaid feed to input port 4C. Input port 4C is mapped to both output port 6A and output port 5B. Output port 6A is coupled to a video screen 146, so that the enhanced and coordinate-overlaid feed is displayed on a video screen 146. Output port 5B is coupled to functional module 143 along with output port 5A and a second instance of output port 5B. Functional module 143 is configured to scale and combine the received image streams and overlay the mission ID 142 to form an image stream comprising the original analog video stream 140 in a reduced scale alongside the enhanced and coordinate-overlaid image stream, with the mission ID displayed near the top of the images. This mixed stream is provided to input port 5A, which is mapped to output port 6D and displayed on video screen 147.

Figure 3C:
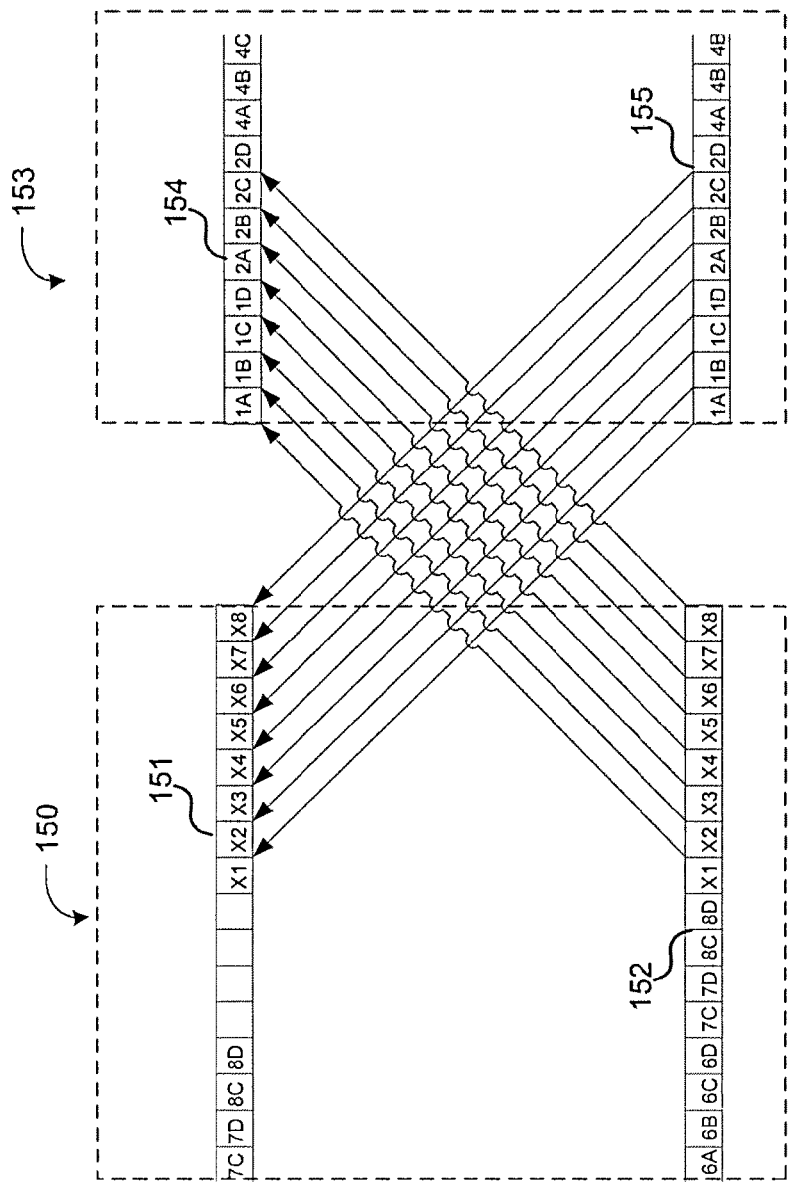
FIG. 3C illustrates an exemplary method of coupling switch fabrics according to an embodiment of the invention.

FIG. 3C illustrates an exemplary method for switch fabrics according to an embodiment of the invention. A portion of a first switch fabric 150 is illustrated with input array portion 151 and output array portion 152, and a portion of a second switch fabric 153 is illustrated with input array portion 154 and output array portion 155. By electrically coupling the output portions of the switch fabrics in the manner illustrated, the two switch fabrics may be combined such that an input device coupled to an input port of array portion 151 can be routed to an output of array portion 155. For example, input port 8D of array 151 might be mapped to output port X1 of array 152 which is in turn mapped to input port 1A of array 154. Input port 1A of array 154 may then be mapped to any of the output ports of array 155. In some embodiments of the invention, such fabric coupling may be employed to achieve a required number of input or output ports. In other embodiments of the invention, this method of fabric coupling may be extended arbitrarily, thereby allowing multiple embodiments of the invention to be coupled together to allow system scaling.

In further embodiments of the invention, the fabric coupling may be configured redundantly to enable failover operation. In yet further embodiments, the switching fabric is capable of supporting a variety of standard protocols in addition to video including, but in no way limited to, Ethernet, Serial Attached SCSI (SAS), Serial ATA (SATA), and PCI Express (PCI-E).

FIGS. 4-8 illustrate a process of configuring an embodiment of the invention for use in the ground station component of a UAV system. In this embodiment, a UAV ground station is equipped with a plurality of monitors, control systems, and communication devices to allow a number of personnel to operate one or more UAVs.

Figure 4:
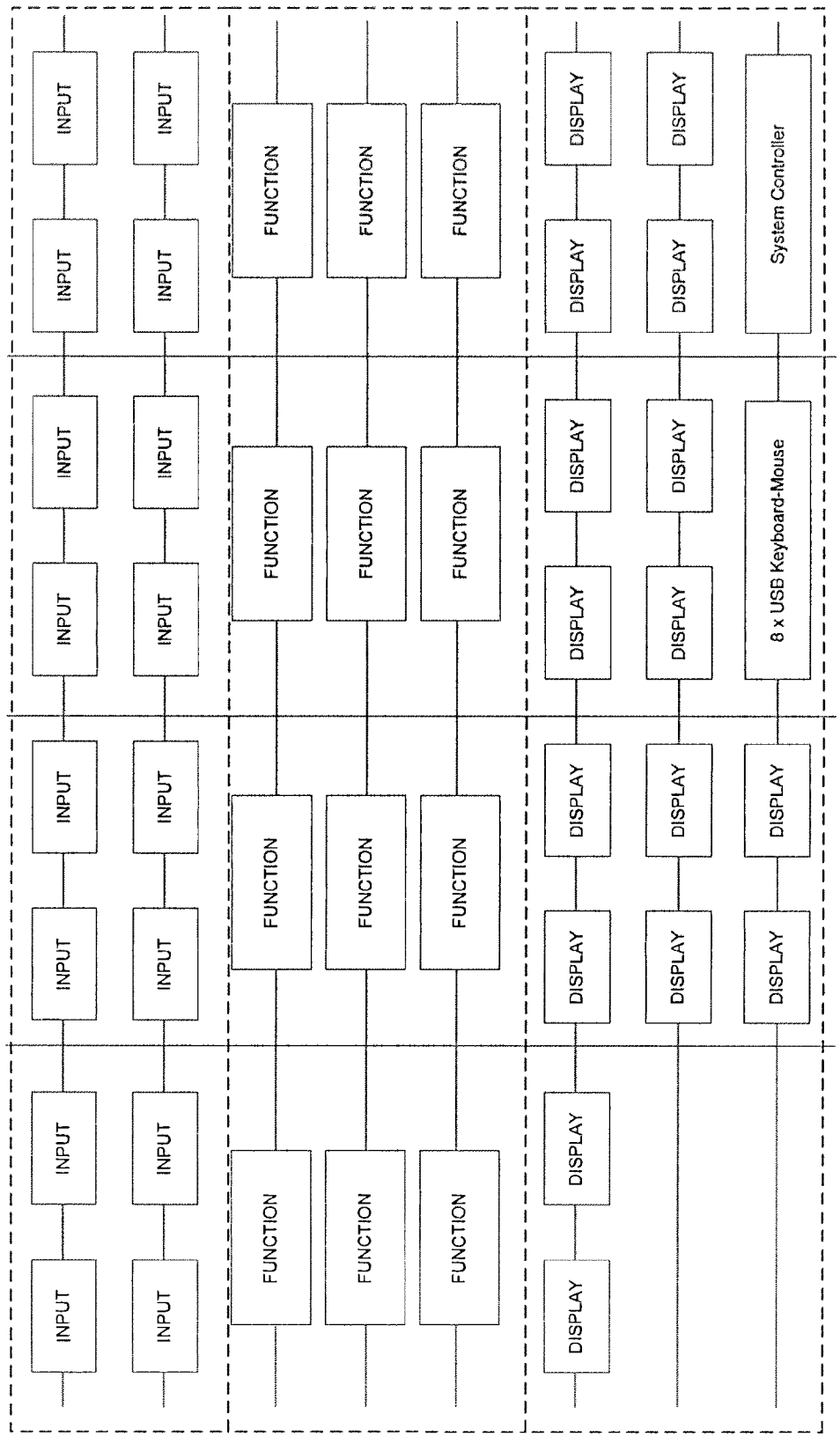
FIG. 4 illustrates an exemplary initial view of a GUI of a non-configured system according to an embodiment of the invention.
Figure 5:
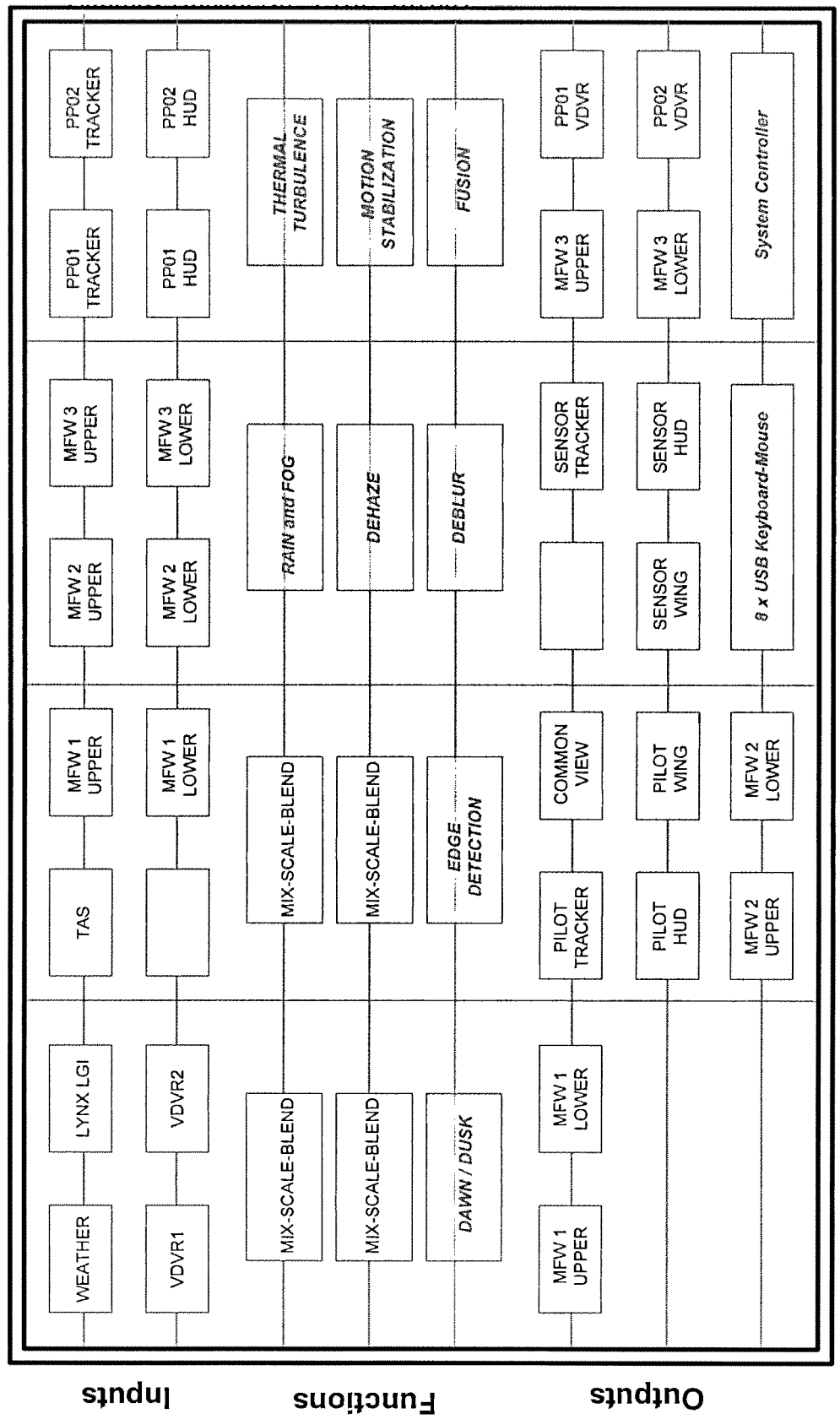
FIG. 5 illustrates an exemplary first step of the configuration of a system according to an embodiment of the invention.
Figure 6:
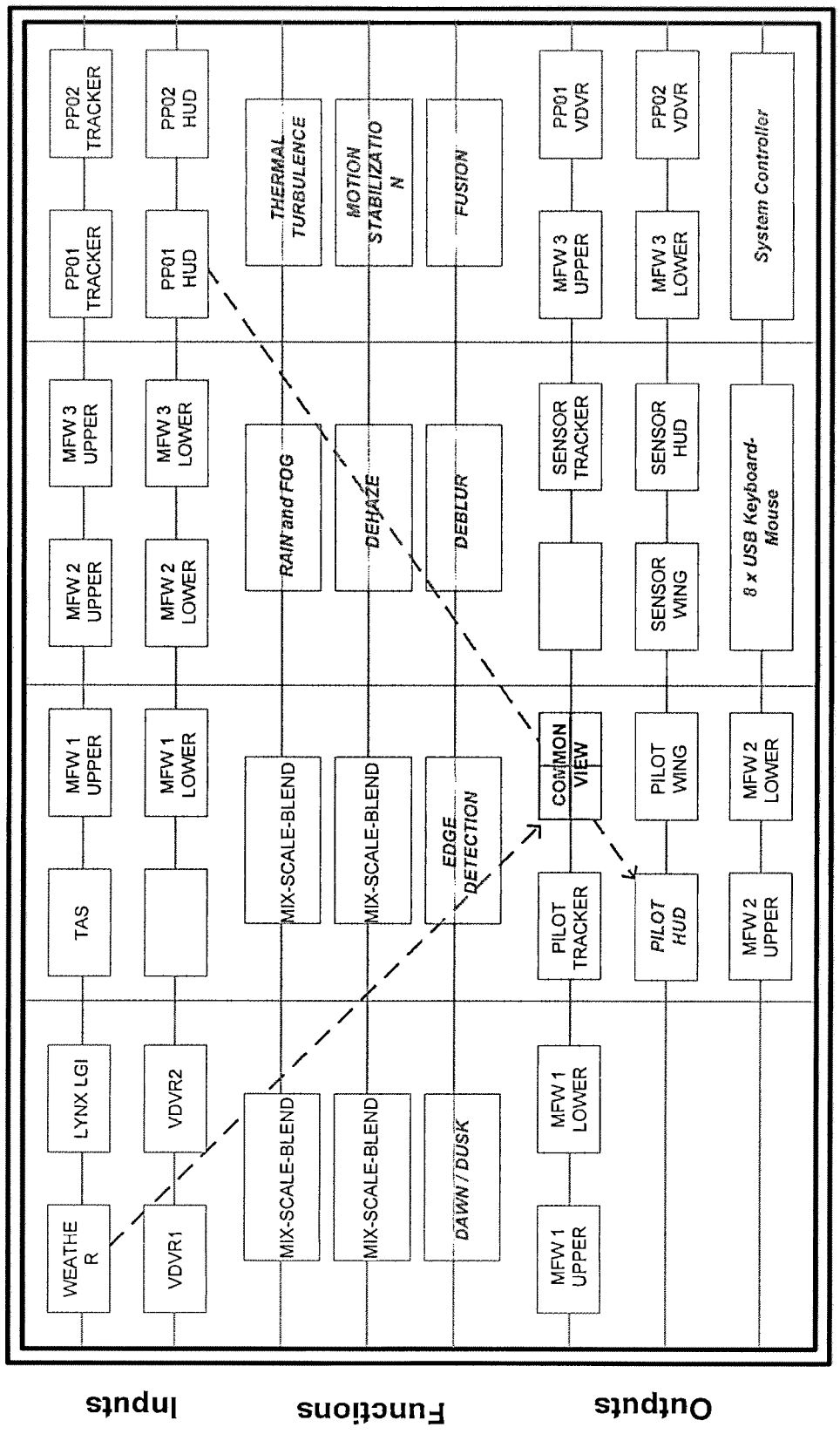
FIG. 6 illustrates an exemplary second step of the configuration of a system according to an embodiment of the invention.

FIG. 4 illustrates an exemplary initial view of a GUI of a non-configured system for installation in a UAV ground station. As illustrated by FIG. 5, configuration begins by labeling the sources and destinations for the input modules and output modules, respectively, and determining the specific functions of the function modules. Next, as illustrated by FIG. 6, the destinations for the input data streams are determined. For example, a weather data stream, such as provided by a weather station or other data source, is configured to be displayed in a common view display device; and the output of the heads-up display of a pilot payload operator station is configured to be displayed on the pilot's heads-up display.

Figure 7:
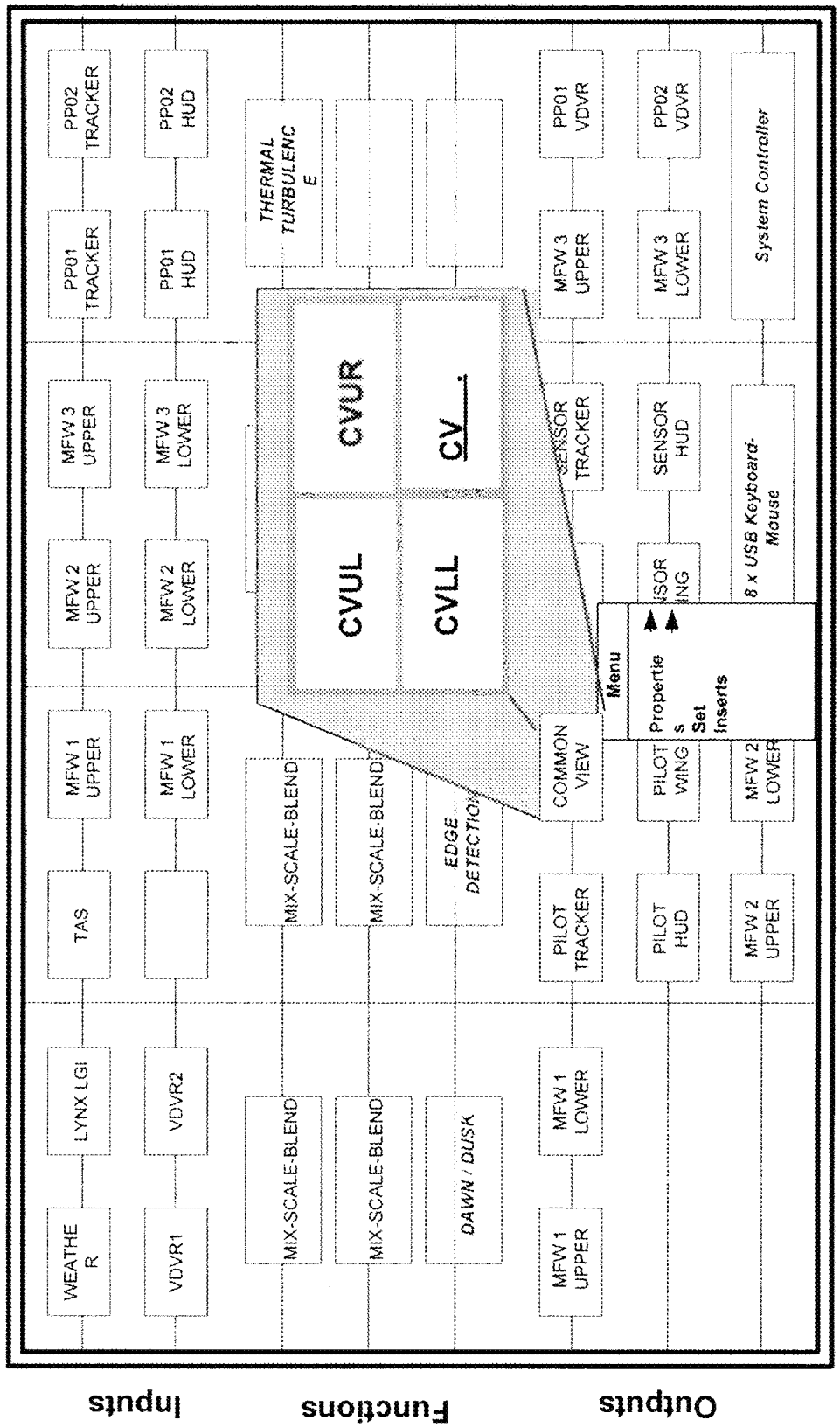
FIG. 7 illustrates an exemplary third step of the configuration of a system according to an embodiment of the invention.

In some embodiments, an exemplary third step illustrated in FIG. 7, allows a system user to define one or more virtual displays, such as optional picture-in-picture displays, that can be activated during system operation. A user can define one or more display areas (i.e., virtual displays) within any physical or conceptual display screen, which can then serve as a destination for an image stream that may have been processed through an image processing module (e.g., scaled, blended, chroma-keyed). For example, a common view display device may be partitioned into two or more virtual displays to allow multiple input streams to be displayed simultaneously, such as displaying multiple versions of a live image stream derived from different input sources or different image enhancement processes.

Additionally, in some embodiments, the user can define one or more touch sensitive areas, also referred to as virtual buttons 189, on an external display monitor that can be monitored for touch activity to control the system or to emit user programmable data strings to one or more external computers or devices (e.g., data strings might be used to tune a radio or other external device) associated with the display.

Figure 8:
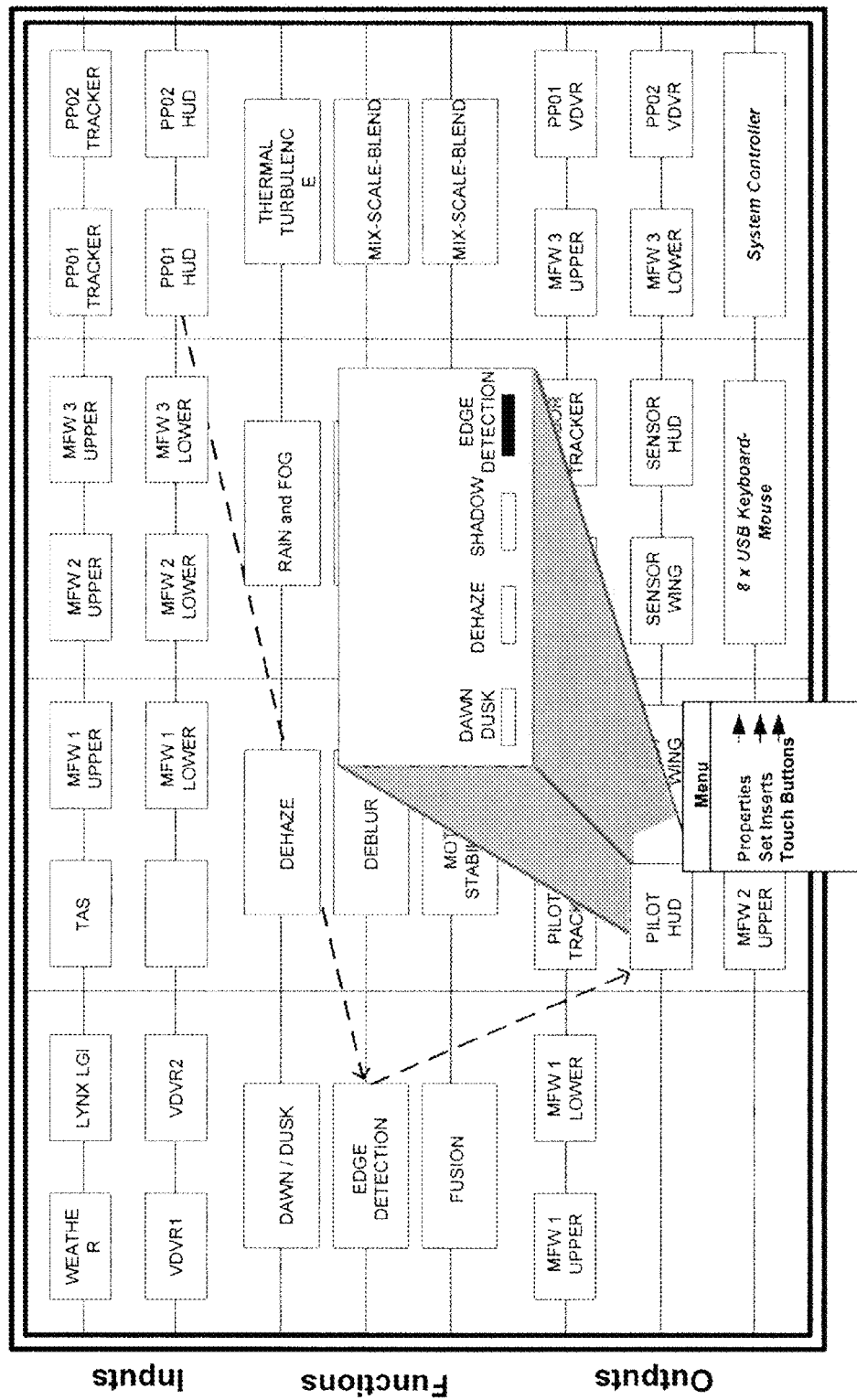
FIG. 8 illustrates an exemplary fourth step of the configuration of a system according to an embodiment of the invention.

In the exemplary fourth step, as illustrated in FIG. 8, a plurality of desired system commands are named and defined by selecting routing configurations corresponding the desired command. For example, as described with respect to FIG. 6, the PPO-1 HUD data stream is routed to the pilot HUD display and the system may be configured such that a command is defined by a route between the source and destination that is intersected by one or more functional modules, such as an edge detection command resulting in the PPO-1 data stream being routed through an edge detection function prior to display on the pilot HUD.

Figure 9A:
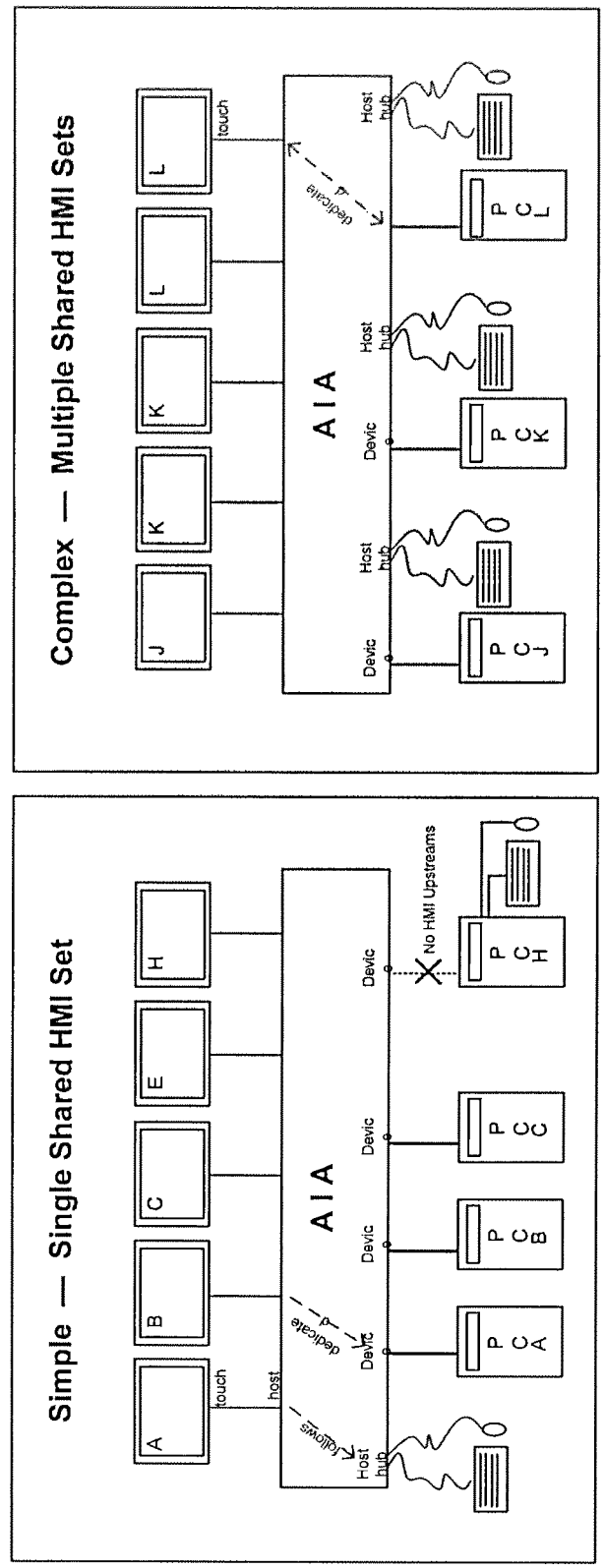
FIG. 9A illustrates how system and connected device control can be centralized or distributed using exemplary system routing functions according to an embodiment of the invention.

FIG. 9A illustrates how system and connected device control can be centralized or distributed using exemplary system routing functions. For example, a human machine interface (HMI) such as a keyboard and mouse may be coupled to the switch fabric such that it is able to control the implementation of the predetermined commands and to reroute streams according to the desires of the system user. Multiple HMIs may be provided and may share control or be given control of a subset of the input and output devices according to system configuration. Accordingly, an additional step of system configuration may comprise mapping the HMIs between the display devices, the source devices, and the functional image processing modules.

Additionally, although not shown, in some embodiments, a display device can communicate human interface device (HID) touch screen or operator button events back to the system through the output interface providing it with an image source. By doing so, the system eliminates the need for an additional cable and or an external computer to monitor and react to the human interface device events for purposes of controlling the system. Additionally, the system can appropriately route human interface device (HID) events to source computers associated with a particular virtual display inserted within a display device.

For example, the touch screen events may be detected by the display device and passed back to the system (i.e., the image source) using a Display Data Channel (DDC) to control the configuration and routing of the system. The Display Data Channel (DDC) is a serial bus incorporated into some video monitors, thereby allowing some of those specifically configured display devices to provide their image source with descriptive data called Extended Device Identification Data (EDID). Though this serial channel is normally used to query the display for identification or operating attributes, in the current example it is being utilized to also relay control information from the display device to the system. It should be appreciated that other channels similar to that of the Display Data Channel incorporated into an image source connection could also be utilized to implement similar functionality in other embodiments.

Figure 9B:
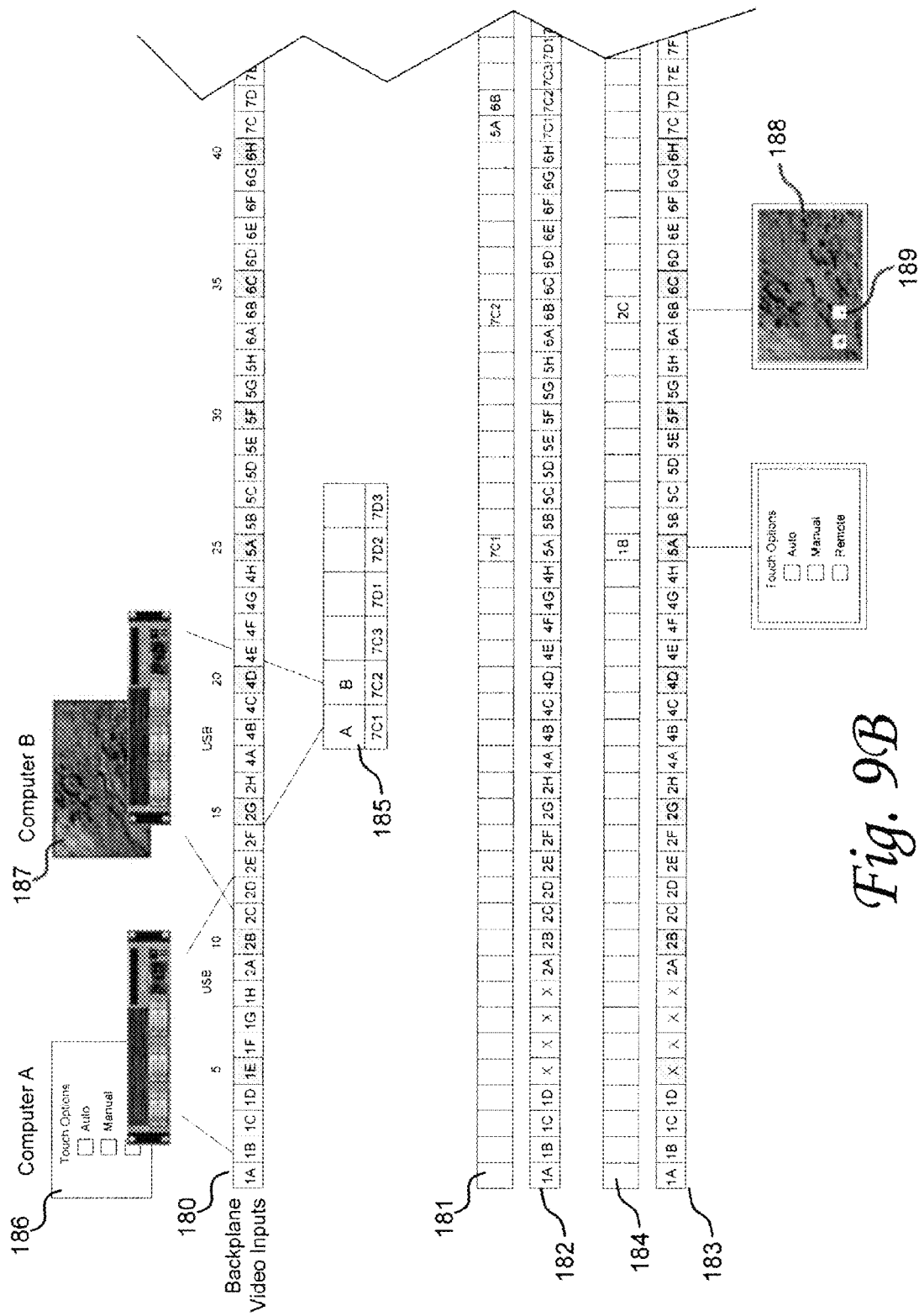
FIG. 9B illustrates an exemplary switch fabric implementation of device control according to an embodiment of the invention.
Figure 9C:
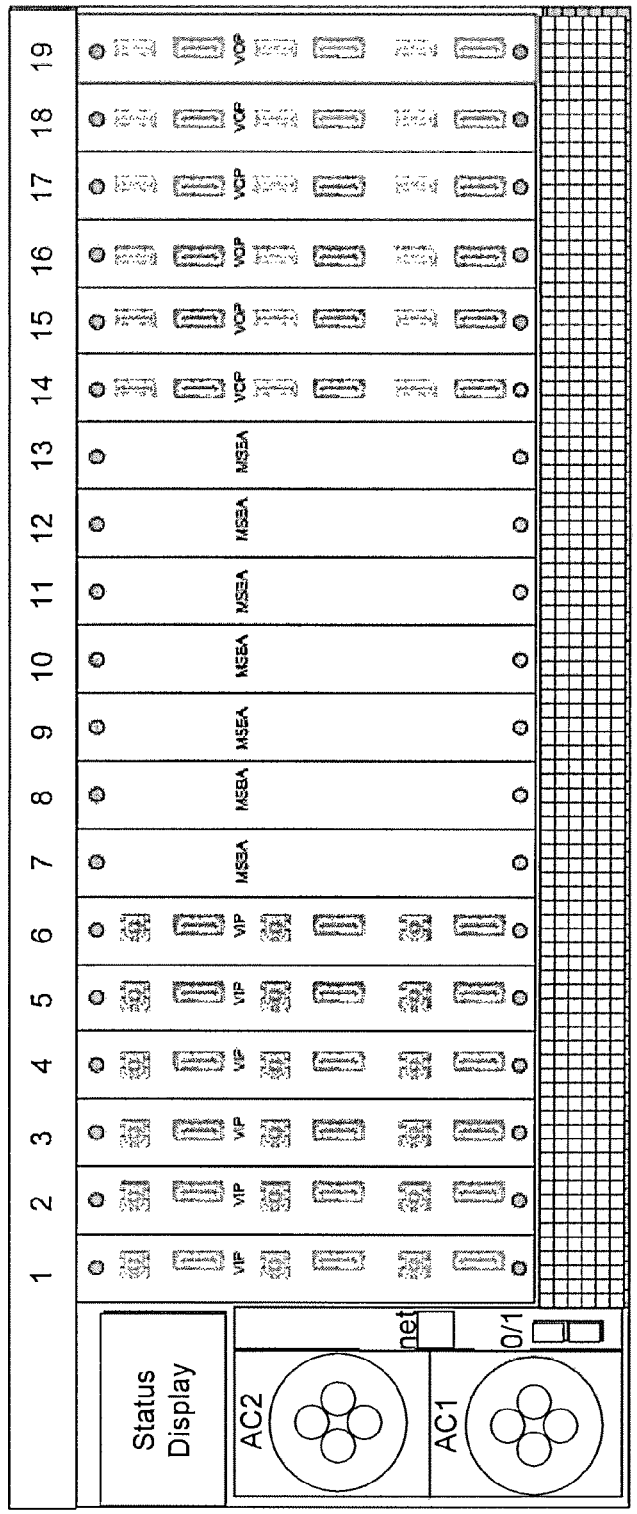
FIG. 9C illustrates an alternative configuration of an exemplary switch fabric chassis according to an embodiment of the invention.

FIG. 9B illustrates an exemplary method of implementing distributed system control functions according to an embodiment of the invention. In this embodiment, input port array 180, output port array 183, and mapping table 184 are substantially similar to the corresponding arrays described with respect to FIG. 3B. Additionally, control port arrays 182 and 185 are provided to allow reconfigurable control of input devices 186 and 187. In this embodiment, input devices 186 and 187 are electrically coupled to output control port array 185 to allow control signals to be transmitted from output control port array 185 to the input devices 186 and 187. For example, the control signals may be transmitted according to a USB standard and the output control port array 185 may comprise a plurality of addressable USB ports. In the illustrated embodiment, an input control port array 182 is provided with ports corresponding to the output ports of array 183. These ports are mapped 181 to output control ports of output control port array 185. For example, display device 188 may comprise a touch screen display with a video connection coupled to output ports 6B of array 183 and a USB connection coupled to port 6B of array 182. Port 6B of array 182 is mapped to port 7C2 of array 185, which is in turn electrically coupled to input device 187. Accordingly, touch commands executed on display 188 are transmitted to input device 187. As described herein, in embodiments employing USB or other full-duplex control protocols, modules may be coupled to the ports of array 182 and array 185 to allow the full-duplex control protocols to be translated into corresponding half duplex signals for transmission through the system and to be retranslated into the original full-duplex control signals for transmission to the input devices.

Certain embodiments may provide sophisticated vision systems operable in providing one or more external views for various types of vehicles (e.g., ground vehicles, aircraft, watercraft, or spacecraft), particularly those vehicle that are windowless or have a limited external view through a window (e.g., due to size, smoke, or airborne debris). An exemplary vision system in accordance with some embodiments may provide a pilot of a helicopter with an external view from the helicopter that would otherwise be obstructed during helicopter brownouts. In another example, a vision system in accordance with some embodiment may provide a driver of a windowless, armored vehicle with a panoramic, external view from the armored vehicle. The external views provided by such exemplary vision systems may be facilitated through one or more external facing image capture devices disposed on the vehicle and one or more displays disposed in the cabin of the vehicle to provide one or more occupants with the external views. The image capture devices utilized by some vision systems may be accessible through network connections (e.g., camera disposed on a hovering UAV and accessible over a network connection), and may be configured to capture images in a variety of frequencies on the electromagnetic spectrum, including x-ray, gamma ray, and infrared. Through various embodiments, the images captured and provided through the vision system may be processed and enhanced to provide, for example, improved visibility and versatile viewing options (e.g., 360° view, or some other field of view), which can support superior situational awareness or surveillance from a vehicle.

FIG. 10 illustrates an armored vehicle environment 200 in which an exemplary system can be implemented in accordance according with an embodiment of the invention. As depicted, the armored vehicle environment 200 comprises an armored personnel carrier (APC) 202 equipped with external-view image capture devices 204 (e.g., video cameras, infrared cameras, etc.) disposed on all sides, and configured to carry within its cabin a vehicle operator 206 (e.g., driver), a vehicle commander 208, and a weapons operator 210 (e.g., gunner), and a squad of security personnel 212 ("squad 212"). Depending on its configuration, the APC 202 may be a windowless vehicle or may have a limited number of windows in order to provide more protection for the occupants of the APC 202. The APC 202 is further equipped with vehicle operator display panels 214, vehicle commander display panels 216, and weapons operator display panels 218, which respectively provide the vehicle operator 206, the vehicle commander 208, and the weapons operator 210 with visual information (e.g., text, graphics, images, image overlays, video, etc.) they need to for proper operation of the vehicle (e.g., according to the present mission).

For example, the vehicle operator display panels 214 may provide the vehicle operator 206 with such information as telemetry data (e.g., regarding the APC 202 or, perhaps, another vehicle in a vehicle convoy), with an external view from the APC 202 (e.g., a panoramic, external view from the APC 202 by way of the external view from the image capture devices 204), navigation information, and visual information regarding the current mission (e.g., mission map from an on-board mission computer or from the command and control center). In another example, the vehicle commander display panels 216 may provide the vehicle commander 208 with mission critical information (e.g., from the command and control central), with surveillance information (e.g., video stream from a locally operating UAV), and an external view from the APC 202 (e.g., the same view of local surroundings provided to the vehicle operator 206). In some environments, the squad 212 may be provided with one or more displays configured to provide visual information they may utilize during a mission.

The operation of some or all of the vehicle operator display panels 214, the vehicle commander display panels 216, or the weapons operator display panels 218 may be facilitated through various embodiments described herein. For example, the vehicle operator display panels 214 may be implemented using a vehicle vision system in accordance with an embodiment. As noted herein, use of certain embodiments may enable some or all of the panels 214, 216, or 218 to provide visual information from other vehicles (e.g., other vehicles in a common convoy that are providing an image stream over a network connection with the APC 202). Accordingly, for some embodiments, the vehicle operator 206 may be located essentially directly behind some of the image capture devices 204 that provide image streams to the vehicle operator display panels 214. The image streams received from the image capture devices 204 may, at times, provide views that the vehicle operator 206 would normally be seeing if they were looking directly through the windows in the APC 202. With the ability to access and share image streams over a network connection, in real time, the vehicle operator 206, the vehicle commander 208, or the weapons operator 210 may create views to represent the scenery on all sides of the APC 202 or alternatively, connect to cameras on another vehicle to study the views from a different perspective of that at other location.

While the features described for FIG. 10 are described with reference to the APC 202, those skilled in the art will appreciate that the features can, according to some embodiments, be applied to other vehicular and mobile environments and a variety of surveillance applications including, for example, transportable shelters.

Figure 11:
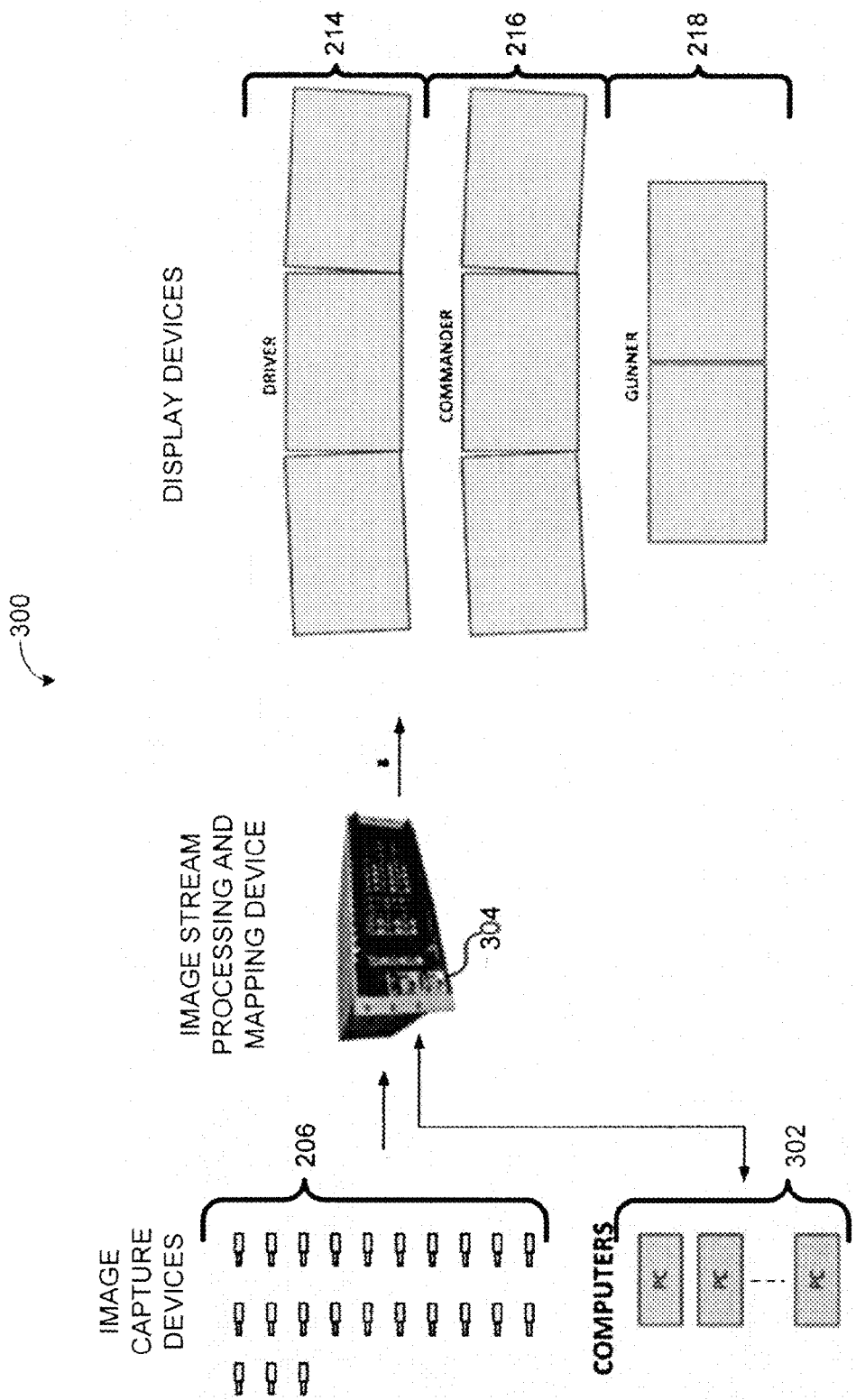
FIG. 11 illustrates an exemplary system architecture for use in a vehicle environment in accordance with an embodiment of the invention

FIG. 11 illustrates an exemplary system architecture 300 that may, in accordance with an embodiment, be utilized in the vehicle environment 200. As shown, the exemplary architecture 300 comprises the image capture devices 206, one or more computers 302, an image stream processing and mapping device 304, the vehicle operator display panels 214, the vehicle commander display panels 216, and the weapons operator display panels 218.

According to some embodiments, the image capture devices 206, which provide an external view from the APC 202, may be communicatively coupled to the display panels 214, 216, and 218 by way of the image stream processing and mapping device 304. Through the image stream processing and mapping device 304, the image streams provided by the image capture devices 206 may be processed (e.g., enhanced, focused, augmented, etc.) and routed to specific display panels 214, 216, 218 according to operator preferences or the environments configuration. Likewise, the image stream processing and mapping device 304 may receive image streams from the computer 302 process those image stream, and then route those image streams to the display panels 214, 216, 218. Depending on the configuration and capabilities of the image stream processing and mapping device 304, the image streams outputted to the display panels 214, 216, 218 may be by way of one or more virtual displays generated by the processing and mapping device 304, whereby individual display panels may receive one or more virtual displays for outputting. The computers 302 that may couple and output to the image processing and mapping device 304 may include, for example, a laptop utilized by an occupant of the APC 202 for mission planning purposes, or on-board vehicle computer (e.g., utilized for navigation, weapons control, communications, etc.).

A number of functions performed by the image processing and mapping device 304 may be implemented by way of a switching fabric/matrix, as described herein in connection with various embodiments. In particular implementations, the image processing and mapping device 304 may comprise a switch fabric/matrix chassis capable of receiving and intercoupling various cards configured to perform image processing functions (e.g., mixing, enhancing, augmenting, etc.), provide image stream input interfaces, and provide image stream output interfaces. The switch fabric/matrix may be configured according to military specifications and may be configured with redundant components (e.g., power supply, image processing units, etc.) to facilitate fail-over services.

Figure 12:
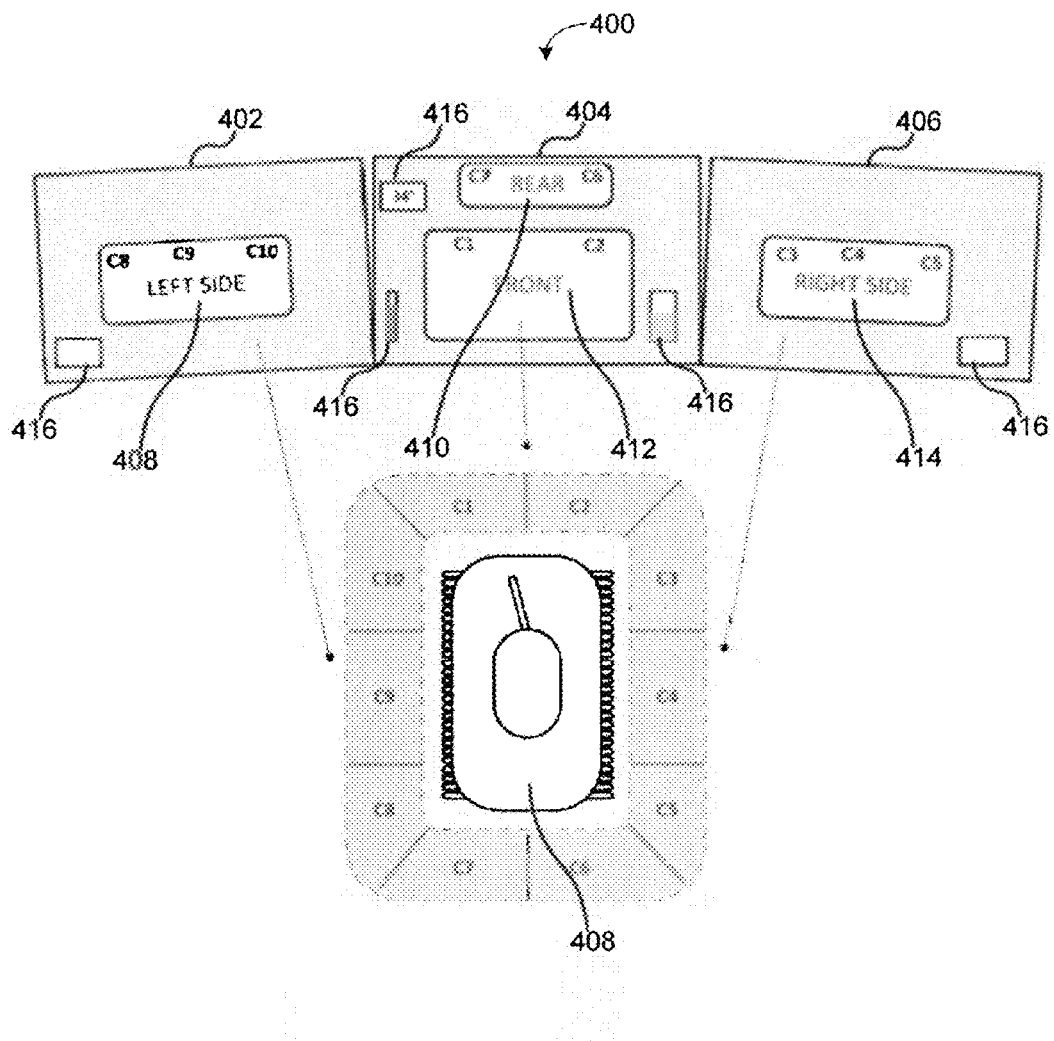
FIG. 12 illustrates an exemplary environment in which display outputs are configured to use virtual display in accordance with an embodiment of the invention.

FIG. 12 illustrates an exemplary environment 400 in which display outputs 402, 404, and 406 are configured to use virtual displays in accordance with an embodiment of the invention. The exemplary environment 400 comprises an armored vehicle 408 that includes external view image capture devices configured to capture camera views C1-C10, around the perimeter of the vehicle 408. In accordance with some embodiments, each of the display outputs 402, 404, and 406 may be ones provided by a vehicle vision system. In particular instances, the display outputs 402, 404, and 406 may be routed to occupants (e.g., vehicle driver, vehicle commander, or weapons operator) of the armored vehicle 408, typically via display devices disposed within the cabin of the vehicle 408. As shown in FIG. 12, the display output 402 includes a virtual display 408 for a left-side external view from the armor vehicle 408, the display output 404 includes a virtual display 410 for rear-side external view from the vehicle 408 and a virtual display 412 for front-side external view from the vehicle 408, and the display output 406 includes a virtual display 414 for right-side external view from vehicle 408.

According to some embodiments, the left-side external view may be generated by stitching together frames from camera views C8, C9, and C10. Similarly, the rear-side external view may be generated by stitching together frames from camera views C6 and C7, and the front-side external view may be generated by stitching together frames from camera views C1 and C2. Likewise, the right-side external view may be generated by stitching together frames from camera views C3, C4, and C5. Depending on the embodiment, the display outputs 402, 404, and 406 may comprise overlay information 416 (e.g., textual and graphical) that is provided in addition to the virtual displays 408, 410, 412, and 414 of the display outputs 402, 404, and 406.

In various embodiments, a panoramic video streams generated from camera views C1-C10 may comprise cameras of different resolutions or format but the embodiments can normalize the resolutions and/or formats by stitching multiple image streams at the frame-level. In certain embodiments, a user may create a panoramic views by assigning adjacent cameras to a virtual display, which may invoke the image stitching algorithms.

Figure 13:
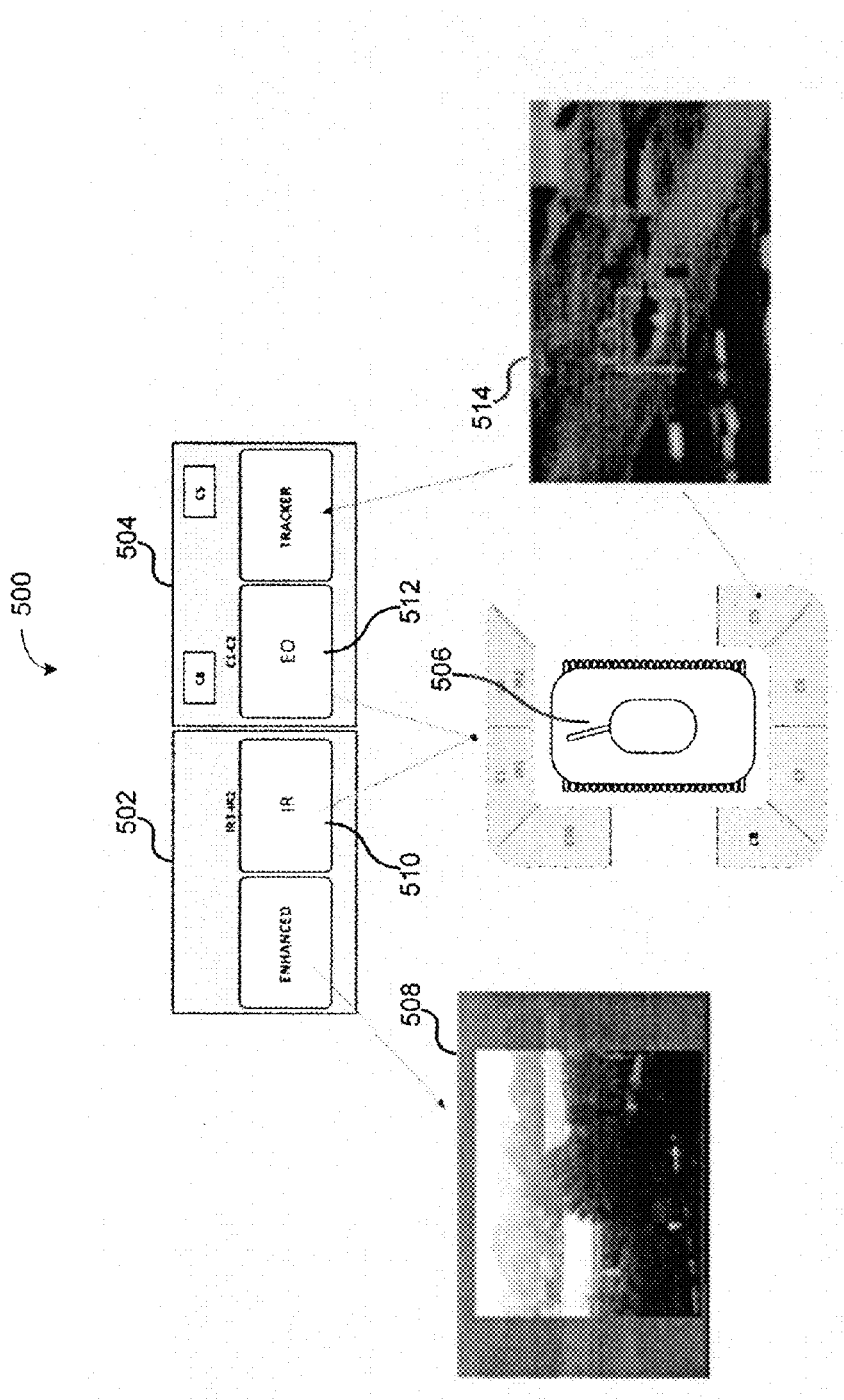
FIG. 13 illustrates an exemplary environment in which display outputs are configured to virtual displays, in conjunction with image enhancement, in accordance with to an embodiment of the invention.

FIG. 13 illustrates an exemplary environment 500 in which display outputs 502 and 504 are configured to virtual displays, in conjunction with image enhancement, in accordance with to an embodiment of the invention. The exemplary environment 500 comprises an armored vehicle 506 that includes external view image capture devices configured to capture camera views C1, C2, C5-C8, and C10, and capture infrared views IR1 and IR2, around the perimeter of the vehicle 506.

As discussed herein, for various embodiments, each of the display outputs 502 and 504 may be ones provided by a vehicle vision system. As also noted herein, the display outputs 502 and 504 may be routed to occupants (e.g., vehicle driver, vehicle commander, or weapons operator) of the armored vehicle 506, typically via display devices disposed within the cabin of the vehicle 506. As shown in FIG. 13, the display output 502 includes a virtual display 508 containing a camera image view enhanced for visibility (e.g., through early morning light, dusk, fog, rain, sand storms, direct sunlight, fog, debris), and a virtual display 510 containing a contiguous, infrared image stream stitched together from infrared views IR1 and IR2. As also shown, the display output 504 includes a virtual display 512 containing an external view stitched together from camera views C1 and C2, and a virtual display 514 containing a camera view enhanced for object tracking. For instance, when an object moves into view of the camera feeding the virtual display 514, a tracking reticle may be overlain over the moving object shown in the image stream.

Figure 14:
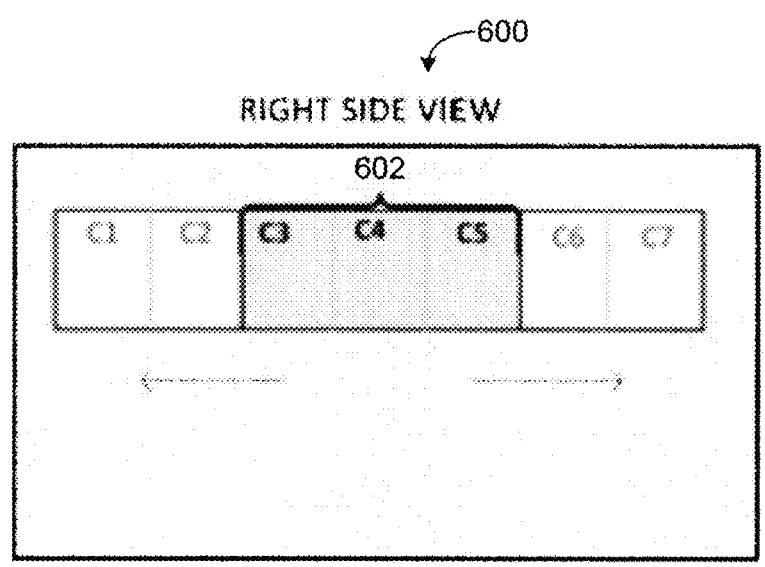
FIG. 14 illustrates an image stream output generated by stitching in accordance with an embodiment of the invention.

FIG. 14 illustrates an image stream output 600 generated by stitching in accordance with an embodiment of the invention. In FIG. 14, the image stream output 600 comprises a stitched, contiguous image stream 602 created from camera views C3, C4, and C5. In some embodiments, the contiguous image stream 602 may only be a portion of a larger contiguous image stream that provides a panoramic view around, for example, a vehicle. Subsequently, when an operator requests that the contiguous image stream 602 be adjusted to pan left or right (or in some other direction) along the panoramic view, various embodiments, may adjust the contiguous image stream 602 by adding or removing the images streams feed by cameras C1, C2, C6 or C7.

Figure 15:
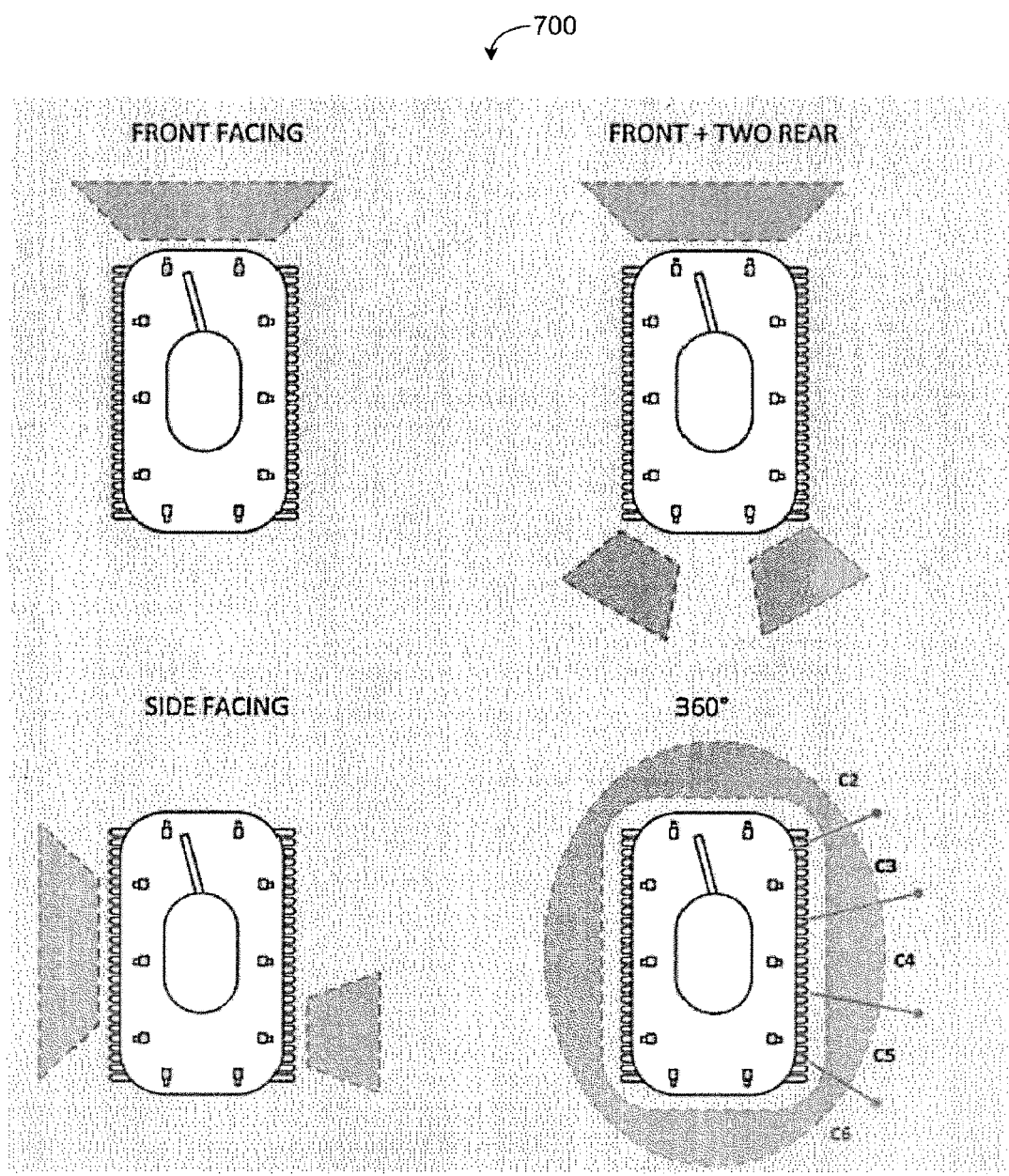
FIG. 15 illustrates vehicle view configurations provided by an exemplary system in accordance with an embodiment of the invention.

FIG. 15 illustrates vehicle view configurations 700 provided by an exemplary system in accordance with an embodiment of the invention. Through certain embodiments, a vehicle vision system may be configured to provide such image stream configurations as a front-facing view, a front and rear-facing views, side facing views, or a panoramic view. Where a view is larger than the display device (or virtual display) to which it is routed, a user may pan through the view or the view may be scaled to fit within the confines of the display device. As described herein, each of the view configurations may be constructed by way of stitching together image streams from two or more cameras providing an external view from the vehicle. In certain embodiments, a vehicle vision system may be configured to be non-blocking, so that image streams can be connected to any number of video outputs simultaneously.

Figure 16:
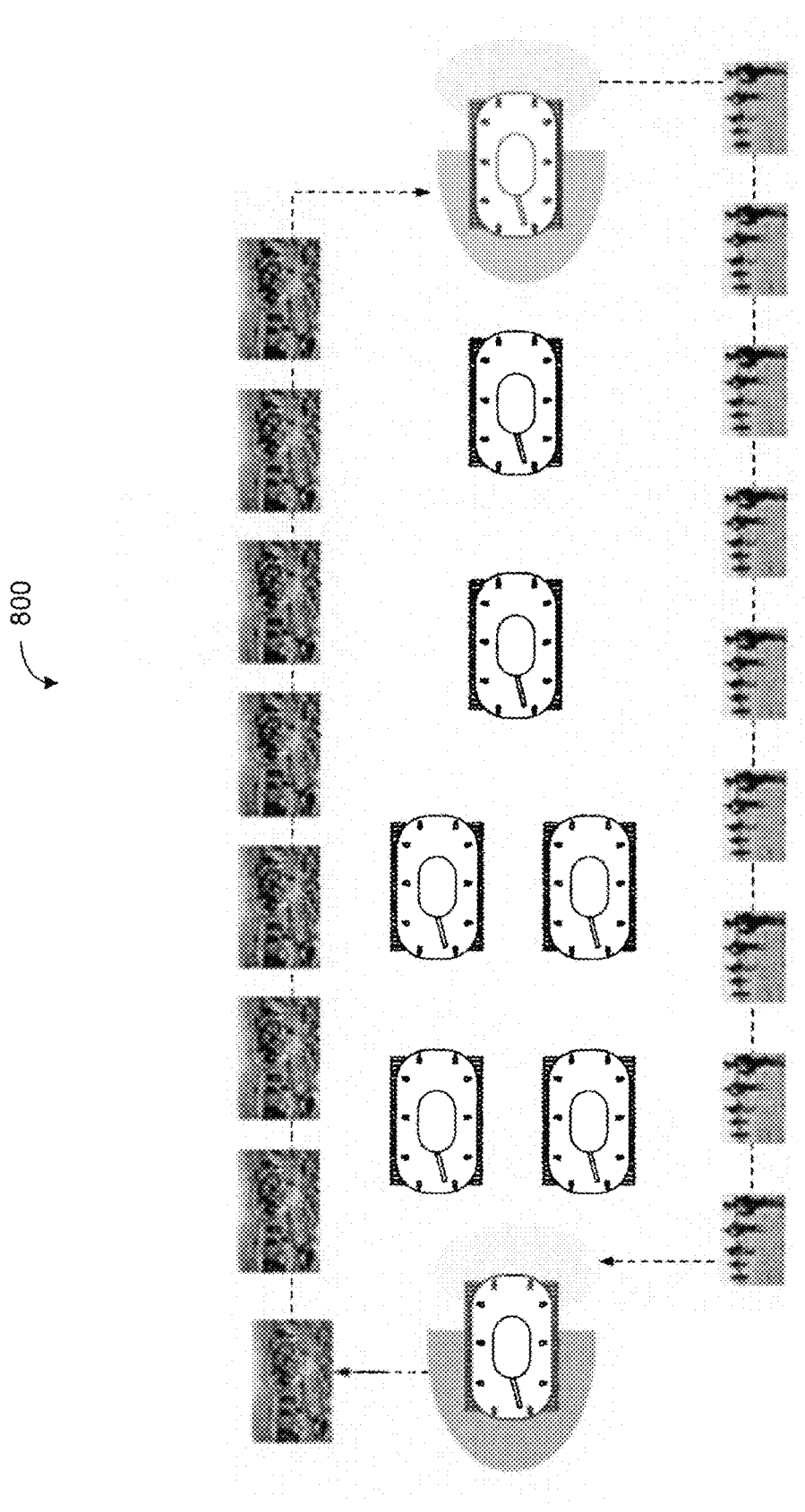
FIG. 16 illustrates a vehicle view configuration provided by an exemplary system in accordance with an embodiment of the invention.

FIG. 16 illustrates a vehicle view configuration 800 provided by an exemplary system in accordance with an embodiment of the invention. As described herein, various embodiments may enable vehicles to share image streams amongst each other over network connections. In some embodiments, the image streams sent across the network may further be encoded using certain codecs, such as H.264, to conserve network bandwidth between vehicles. It is common for armored personnel vehicles (APCs) to travel in convoys and to share information between vehicles. In various embodiments, the vehicle view configuration 800 for the convoy vehicles may be configured such that lead APC might share the view of the road ahead with the rest of the vehicles in the convoy, and the rear APC might share the rear view of the road ahead of the rest of the vehicles in convoy.

Figure 17:
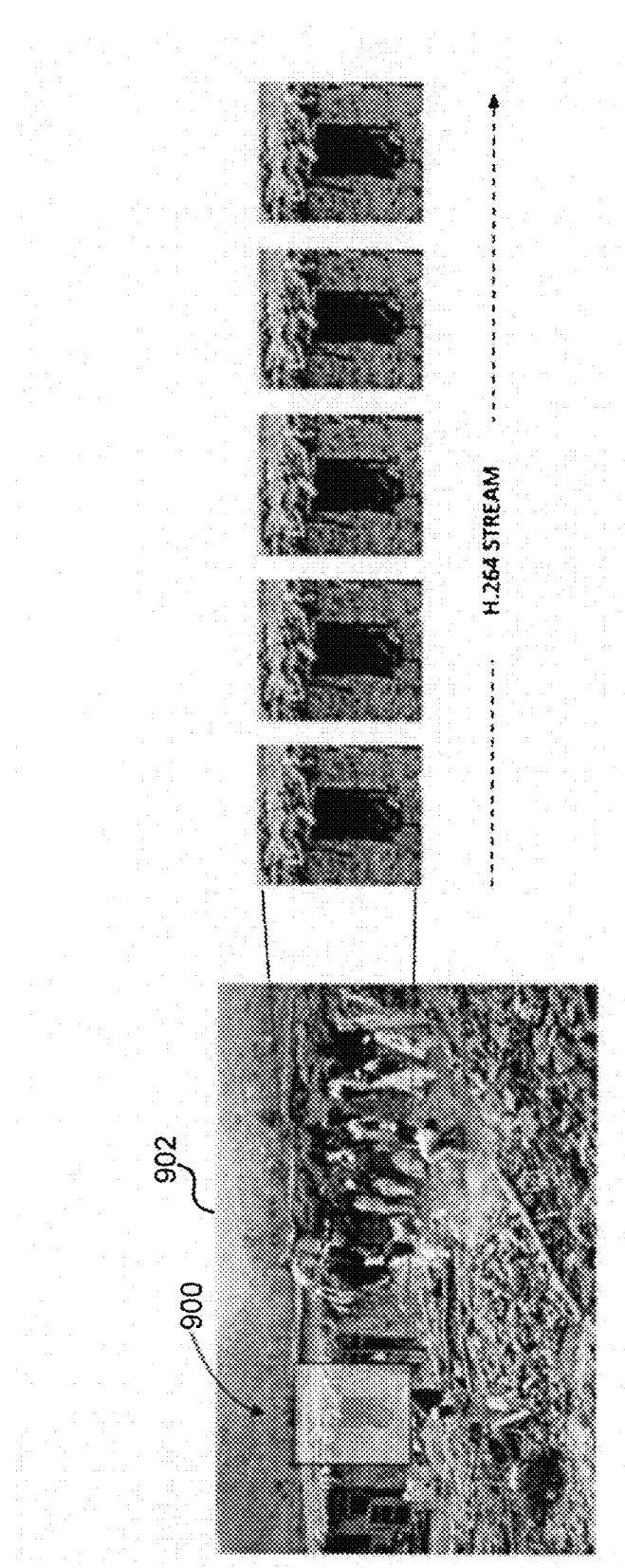
FIG. 17 illustrates encoding of an area of interest in accordance with an embodiment of the invention.

FIG. 17 illustrates encoding of an area of interest 900 in accordance with an embodiment of the invention. According to some embodiments, network bandwidth efficiency may be improved by sending only a small portion of an image stream 902 that represents an area of interest 900. In FIG. 17, a camera view shows that in a distance there is a person standing behind a window, and that person may or may not be armed. According to some embodiments, it may be possible for a user to select only that area of interest 900 in the image stream 902 for encoding and transmission to other interested viewers (e.g., vehicles) to the exclusion of the other portions. Various embodiments may facilitate the area of interest 900 encoding and transmission by first cropping the area of interest 900 from the image stream 902, and then using an image processing module configured to intelligently encode the area of interest 900 for transmission over a network connection (e.g., lowering pixel or color resolution).

Figure 18:
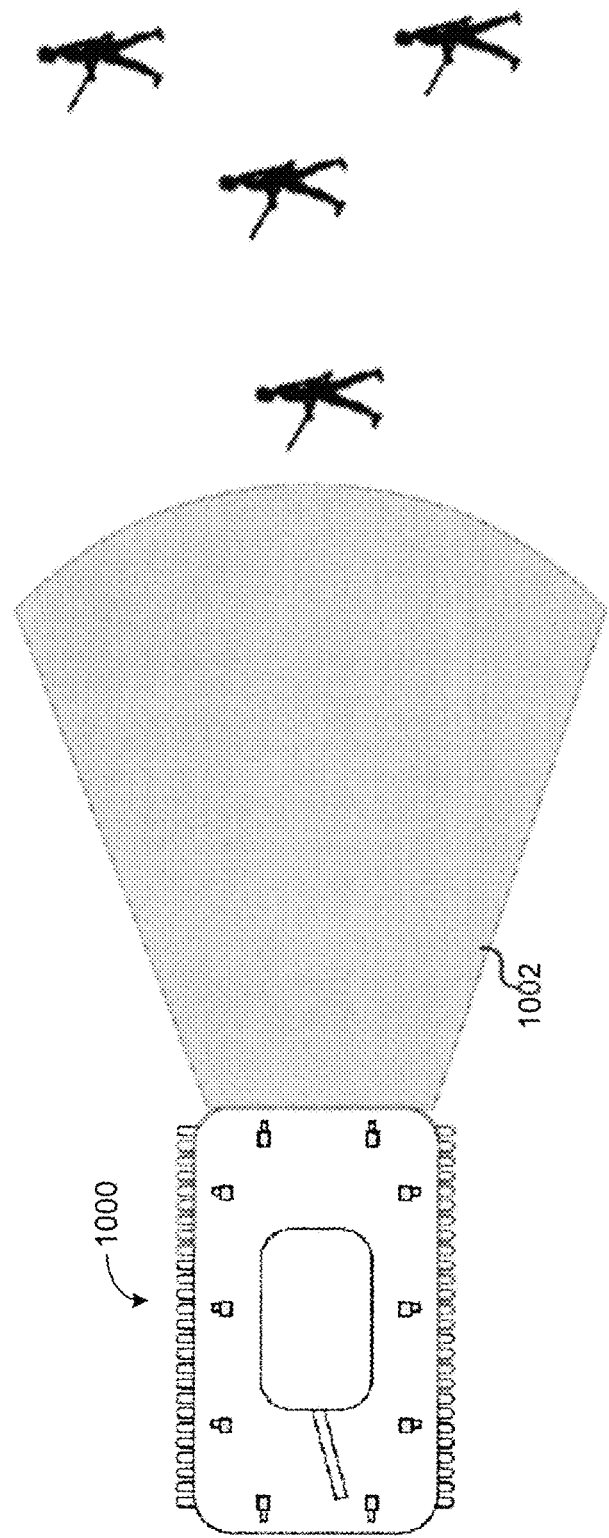
FIG. 18 illustrates a security feature provided by an exemplary system in accordance with an embodiment of the invention.

FIG. 18 illustrates a security feature provided by an exemplary system in accordance with an embodiment of the invention. Certain embodiments may implement virtual fences and/or trip alarms around a vehicle 1000. For example, a user may configure an embodiment to indicate the size and shape of the area 1002 to be monitored within the field of view of an image capture device (e.g., video camera or infrared camera). The user may indicate the minimum size of the object and the minimum length of time such an object would need be remain in the monitored area in order to trip an alarm. Thresholds may be implemented to avoid false alarms such as a small animal moving across the field. The use of virtual fences and/or trip alarms may enable vehicle operators to spot enemy targets, and identifying impending attacks. For some embodiments, thresholds may comprise a time conditions associated with movement of objects (e.g., periodic movement), size of objects, color of the objects, shape of the objects, or rate of movement by objects. In other contexts, virtual fences and/or trip alarms features may be used in long term surveillance applications, such as when police stake out a location and watched for people entering or leaving a building.

To facilitate the detection of object movement, various embodiments may compare each video frame with a previous frame (e.g., perform frame-differencing) to construct/generate a set of difference (deltas), which may be utilized to detect movement within the area 1002 being monitored. In some instances, the set of difference may be stored in a data storage device, to facilitate the detection features and/or to provide a searchable index of time references to particular deltas in a recorded image stream. For example, with a delta frame database, a user may query the system to identify whether specific types of event might have occurred within the monitored space. When the database responds to user queries, the user may be presented with thumbnail images of the video scenes which resulted in a tripped alarm.

Figure 19:
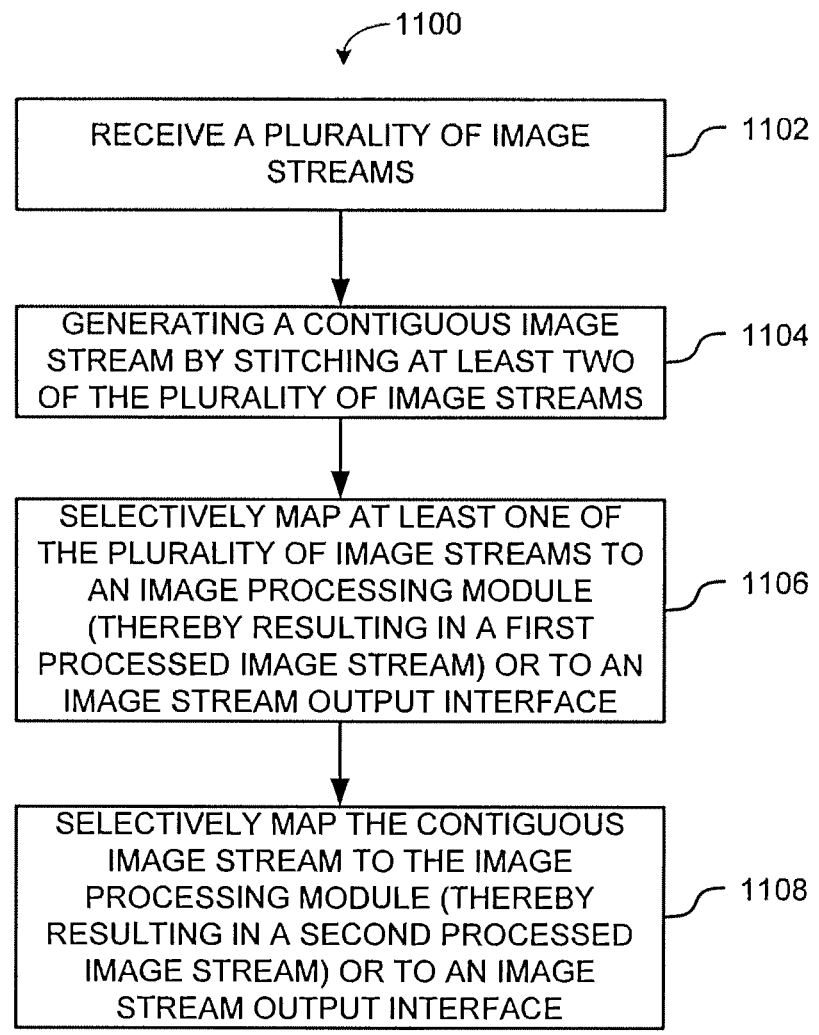
FIG. 19 is a flowchart illustrating an exemplary method for image stream stitching in accordance with an embodiment of the invention.

FIG. 19 is a flowchart 1100 illustrating an exemplary method for image stream stitching in accordance with an embodiment of the invention. The method may determine how various embodiments may stitch together multiple image streams into a contiguous image stream.

The method may begin with operation 1102 where a plurality of image streams may be received for stitching purposes. In some embodiments, the received image streams may comprise at least one image stream based on an image stream from an image stream input interface. For example, the received image streams may comprise one or more image streams from one or more image stream input interfaces coupled to a plurality of cameras. In some instances, at least one of the plurality of image streams received from the image stream input interface may be processed by an image processing function before it is received.

At operation 1104, a contiguous image stream may be generated from at least two image streams that are based on image streams from the plurality of image streams. In some embodiments, the image streams may be stitched such that the image streams are side-by-side to create a contiguous image stream. Subsequently, at operation 1106, at least one of the plurality of image streams may be selectively mapped to an image processing module or to an image stream output interface. With respect to the contiguous image stream generated at operation 1104, at operation 1108, the contiguous image stream may be selectively mapped to the image processing module or to an image stream output interface. Depending on the embodiment, the contiguous image stream may be shared with other interested viewers, typically over a network connection.

Figure 20:
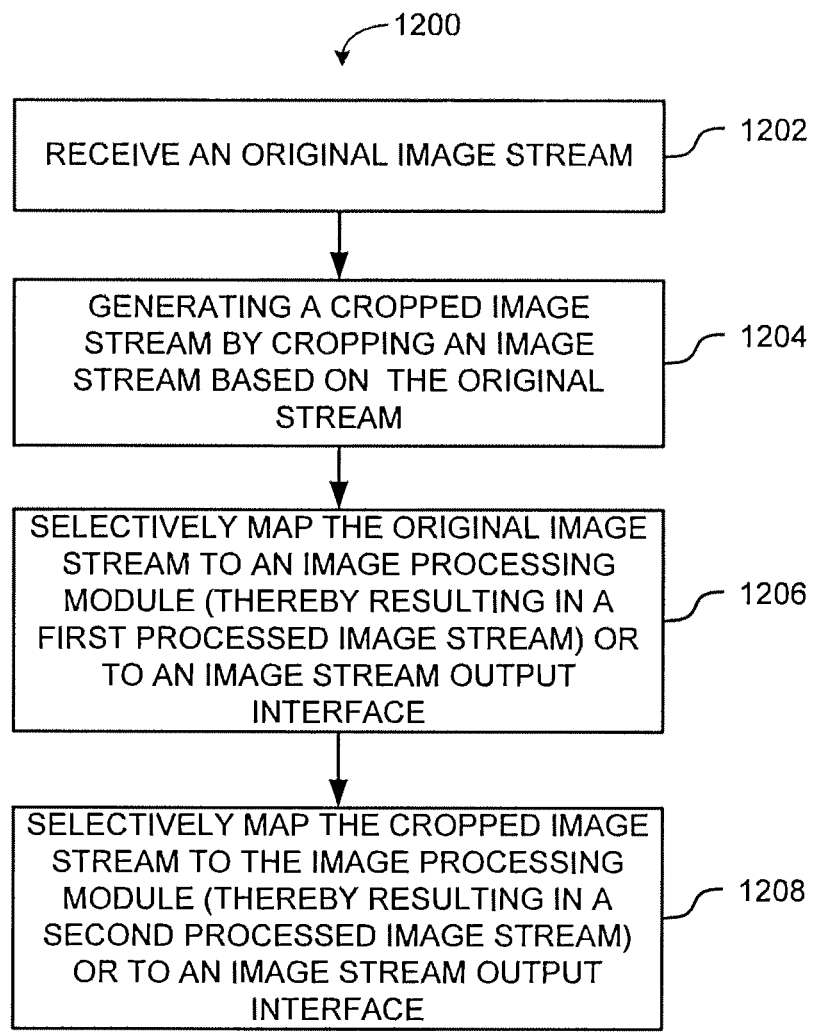
FIG. 20 is a flowchart illustrating an exemplary method for image stream cropping in accordance with an embodiment of the invention.

FIG. 20 is a flowchart 1200 illustrating an exemplary method for image stream cropping in accordance with an embodiment of the invention. The method may determine how various embodiments crop areas of interest from a particular image stream.

The method may begin with operation 1202 where an original image stream may be received. The original image stream may be received through an image stream input interface, or may be processed by an image processing module before being received. For example, the original image stream may be received from an image capture device coupled to an image stream input interface.

At operation 1204, one or more portions of an image stream, based on the original image stream, may be cropped at the exclusion of the remainder of the image stream. Depending on the embodiment, the portion(s) cropped may be according to one or more user selections, which may be facilitated through a human machine interface device (e.g., mouse or keyboard). For some embodiments, the cropped image stream may be an area of interest that a user has selected for encoding and transmission to an interested viewer.

Subsequently, at operation 1206, the original image stream may be selectively mapped to an image processing module or to an image stream output interface. With respect to the cropped image stream generated at operation 1204, at operation 1208, the cropped image stream may be selectively mapped to the image processing module or to an image stream output interface. Depending on the embodiment, the cropped image stream may be shared with other interested viewers, typically over a network connection, as an area of interest.

Figure 21:
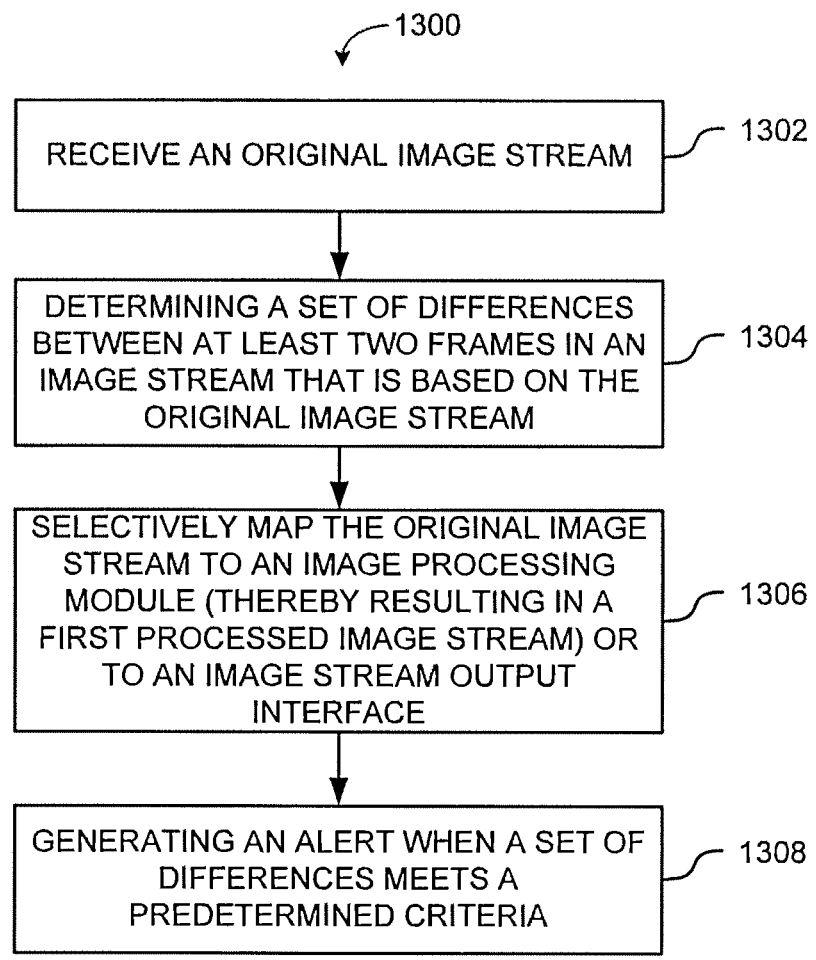
FIG. 21 is a flowchart illustrating an exemplary method for detecting differences in image stream frames in accordance with an embodiment of the invention.

FIG. 21 is a flowchart 1300 illustrating an exemplary method for detecting differences in image stream frames in accordance with an embodiment of the invention. The method may utilized by various embodiments in implementing a virtual fence or trip alarm in accordance with embodiments described herein.

The method may begin with operation 1302 where an original image stream may be received. As described herein, the original image stream may be received through an image stream input interface, or may be processed by an image processing module before being received. As also noted herein, the original image stream may be received from an image capture device coupled to an image stream input interface.

At operation 1304, a set of difference (deltas) may be determined between at least two frames in an image stream that is based on the original image stream. In various embodiments, the set of differences may facilitate detection of object movement in the original image stream. In some embodiments, the set of differences may be stored in a database that permits searching for differences in a recorded image stream.

When determining the set of differences, the original image stream may be processed without alteration.

Subsequently, at operation 1306, the original image stream may be selectively mapped to an image processing module or to an image stream output interface. At operation 1308, the set of differences determined at operation 1304 may be utilized to generate an alert when the set of differences meets a predetermined criterion, such as where the set of differences indicates a particular amount of movement, pattern of movement, direction of movement, number of objects, object size, object color, or object shape. Depending on the embodiment, the alert generated may be visual (e.g., textual information or marker) or audio, which in some instances may be augmented onto the original image stream. For example, when an object comes into view of an image capture device and invokes an alert condition based on a user-established virtual fence or trip alarm, the object may be highlighted on the original image stream (or image stream based on the original image stream) that eventually reaches an operator's display device. In some embodiments, a visual alert may be generated and augmented onto the original stream by selectively mapping the original image stream to the image processing module (e.g., at operation 1306) and configuring the image processing module to perform the augmentation process.

Figure 22:
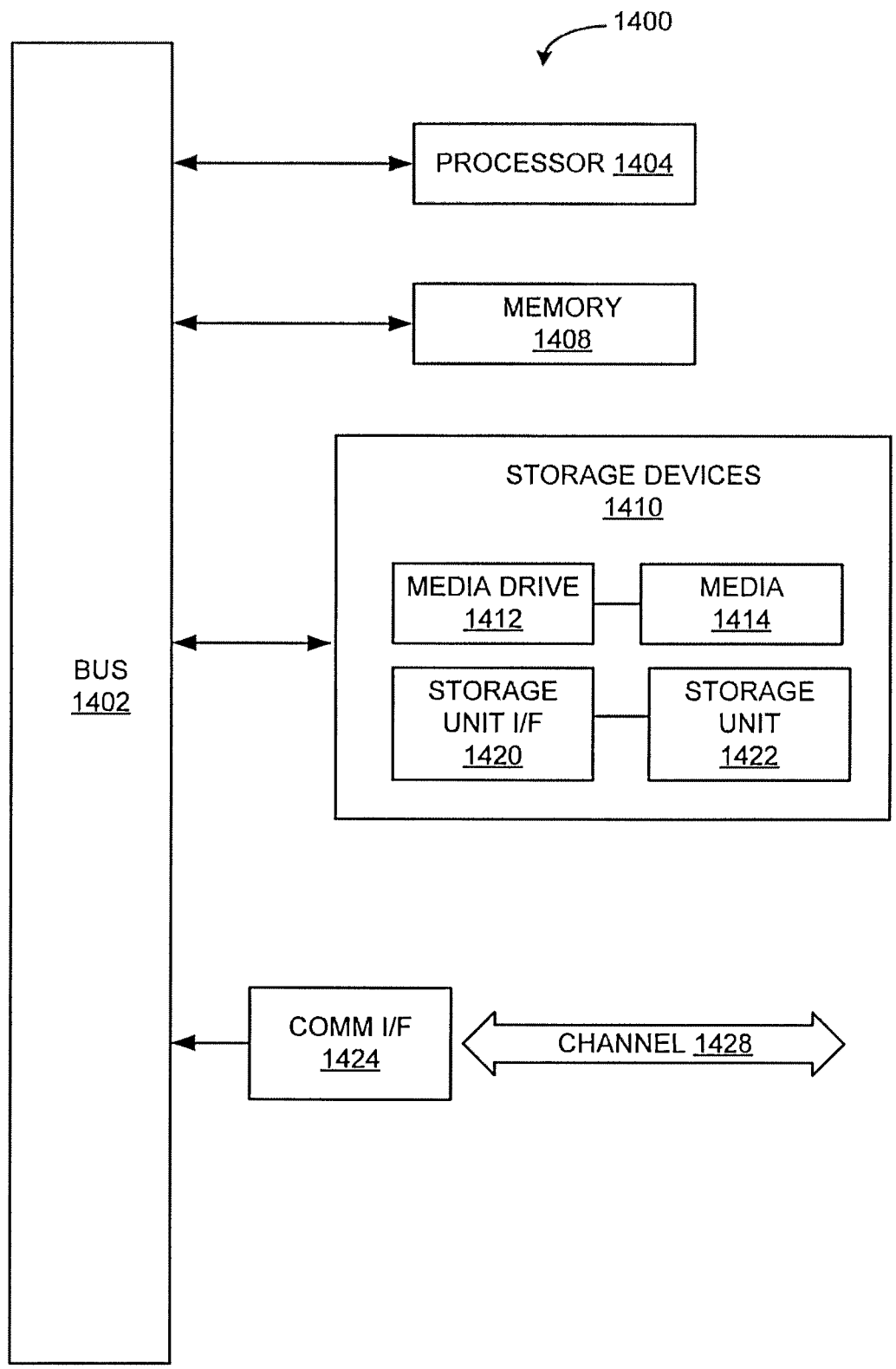
FIG. 22 illustrates a computing module with which various features of embodiments described herein may be implemented.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPCAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such exemplary computing module is shown in FIG. 22. Various embodiments are described in terms of this exemplary computing module 1400. After reading this description, it will become apparent to a person skilled in the relevant art how to implement the invention using other computing modules or architectures.

Referring now to FIG. 22, computing module 1400 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1400 might include, for example, one or more processors, controllers, control modules, or other processing devices, such as a processor 1404. Processor 1404 might be implemented using a general-purpose or special-purpose processing engine such as, for example, a microprocessor, controller, or other control logic. In the illustrated example, processor 1404 is connected to a bus 1402, although any communication medium can be used to facilitate interaction with other components of computing module 1400 or to communicate externally.

Computing module 1400 might also include one or more memory modules, simply referred to herein as main memory 1408. For example, random access memory (RAM) or other dynamic memory might be used for storing information and instructions to be executed by processor 1404. Main memory 1408 might also be used for storing temporary variables or other intermediate information during execution of instructions to be executed by processor 1404. Computing module 1400 might likewise include a read only memory ("ROM") or other static storage device coupled to bus 1402 for storing static information and instructions for processor 1404.

The computing module 1400 might also include one or more various forms of information storage mechanism 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a CD or DVD drive (R or RW), or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to or accessed by media drive 1412. As these examples illustrate, the storage media 1414 can include a computer usable storage medium having stored therein computer software or data.

In alternative embodiments, information storage mechanism 1410 might include other similar instrumentalities for allowing computer programs or other instructions or data to be loaded into computing module 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory module) and memory slot, a PCMCIA slot and card, and other fixed or removable storage units 1422 and interfaces 1420 that allow software and data to be transferred from the storage unit 1422 to computing module 1400.

Computing module 1400 might also include a communications interface 1424. Communications interface 1424 might be used to allow software and data to be transferred between computing module 1400 and external devices. Examples of communications interface 1424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1424 might typically be carried on signals, which can be electronic, electromagnetic (which includes optical) or other signals capable of being exchanged by a given communications interface 1424. These signals might be provided to communications interface 1424 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1400 to perform features or functions of the present invention as discussed herein.

While various embodiments of the present invention have been described above, it should be understood that they have been presented by way of example only, and not of limitation. Likewise, the various diagrams may depict an exemplary architectural or other configuration for the invention, which is done to aid in understanding the features and functionality that can be included in the invention. The invention is not restricted to the illustrated exemplary architectures or configurations, but the desired features can be implemented using a variety of alternative architectures and configurations. Indeed, it will be apparent to one of ordinary skill in the art how alternative functional, logical or physical partitioning and configurations can be applied to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for image stream processing, comprising:
an image stream input interface;
an image stream output interface;
a first image processing module configured to accept a plurality of image streams, stitch at least two image streams from the plurality of image streams into a contiguous image stream, and output the contiguous image stream, wherein the plurality of image streams comprises an image stream from the image stream input interface or from another image processing module;
a second image processing module; and
a switching matrix in communication with the image stream input interface, the image stream output interface, the first image processing module, and the second image processing module, wherein the switching matrix is configured to:
selectively map the image stream from the image stream input interface or from the second image processing module, to the first image processing module, and
selectively map the contiguous image stream from the first image processing module to the image stream output interface or to the second image processing module.

2. The system of claim 1, further comprising a plurality of image stream input interfaces, the plurality of image stream input interfaces being in communication with the switching matrix and including the image stream input interface, wherein at least two of the plurality of image streams are based on a second plurality of image streams received through the plurality of image stream input interfaces.

3. The system of claim 1, wherein the plurality of image streams are based on a second plurality of image streams from a plurality of adjacent cameras, and the contiguous image stream is a panoramic view from a vantage of the adjacent cameras.

4. The system of claim 3, further comprising a plurality of image stream input interfaces, the plurality of image stream input interfaces being in communication with the switching matrix and including the image stream input interface, wherein the second plurality of image streams are received through the plurality of image streams interfaces.

5. The system of claim 3, wherein at least one of the second plurality of image streams has been processed by the second image processing module before being accepted by the first image processing module.

6. The system of claim 1, wherein the switching matrix is further configured to adjust the selective mapping such that in real time, a particular image stream is added to or removed from the plurality of image streams being accepted by the first image processing module.

7. The system of claim 1, wherein the first image processing module performs stitching at frame-level.

8. The system of claim 1, wherein the second image processing module is configured to accept a second image stream from the image stream input interface or from another image processing module, apply an image processing function to the second image stream, and output a processed image stream.

9. The system of claim 8, wherein the image processing function comprises an image stream mix function, an image stream scale function, an image stream blend function, an image stream encoding function, an image stream enhancement function, or image stream cropping function.

10. The system of claim 9, wherein the image stream encoding function comprises a video or audio compression algorithm.

11. The system of claim 9, wherein the image stream enhancement function comprises a de-haze function, a de-blur function, a shadow function, a dawn-dusk function, a fusion function, a stabilization function, a thermal turbulence function, an equalization function, an edge detection function, a rain and fog function, or a light optimizing function.

12. The system of claim 1, wherein the image stream input interface is configured to receive the image stream from an image capture device, an image stream playback device, a computer system, a sensor device, or a medical device.

13. The system of claim 1, wherein the image stream output interface is configured to output to a display, a computer system, or recording device.

14. The system of claim 1, wherein the system is configured to output an image stream through a virtual display.

15. The system of claim 1, further comprising a control interface through which a user can operate the system, configure the system, or check status of the system.

16. A method for image stream processing, comprising:
receiving a plurality of image streams at least one of which is based on an image stream from an image stream input interface;
generating a contiguous image stream by stitching at least two image streams of the plurality of image streams into the contiguous image stream;
selectively mapping at least one image stream of the plurality of image streams to:
an image processing module, wherein the image processing module is configured to receive the at least one image stream from the switching matrix, apply an image processing function to the at least one image stream, and output a first processed image stream, or
an image stream output interface; and
selectively mapping the contiguous image stream to:
the image processing module, wherein the image processing module is further configured to receive the contiguous image stream from the switching matrix apply the image processing function to the contiguous image stream, and output a second processed image stream, or the image stream output interface.

17. The method of claim 16, wherein the plurality of image streams originate from a plurality of adjacent cameras, and the contiguous image stream is a panoramic view from a composite perspective of the plurality of adjacent cameras.

18. The method of claim 16, further comprising adjusting the selective mapping in real time such that a particular image stream is added to or removed from the plurality of image streams being received.

19. The method of claim 16, wherein the stitching is performed at a frame-level.

20. The method of claim 16, wherein at least one of the image stream input interfaces is configured to receive at least one of the image streams from an image capture device, an image stream playback device, a computer system, a sensor device, or a medical device.

21. The method of claim 16, wherein the image stream output interface is configured to output to a display, a computer system, or recording device.

22. A computer readable storage medium having instructions embedded thereon configured to cause a processor to perform the operations of:
receiving a plurality of image streams at least one of which is based on an image stream from an image stream input interface;
generating a contiguous image stream by stitching the at least two image streams of the plurality of image streams into the contiguous image stream;
selectively mapping the at least one image stream of the plurality of image streams to:
an image processing module, wherein the image processing module is configured to receive the least one image stream from the switching matrix, apply an image processing function to the least one image stream, and output a first processed image stream, or
an image stream output interface; and
selectively mapping the contiguous image stream to:
the image processing module, wherein the image processing module is further configured to receive the contiguous image stream from the switching matrix, apply the image processing function to the contiguous image stream, and output a second processed image stream, or the image stream output interface.

23. A vehicle vision system, comprising:
a plurality of image capture devices coupled to a vehicle;
a plurality of image stream input interfaces coupled to the plurality of image capture devices;
an image stream output interface;
a first image processing module configured to accept a plurality of image streams, stitch at least two image streams from the plurality of image streams into a contiguous image stream, and output the contiguous image stream, wherein the plurality of image streams comprises an image stream from at least one of the plurality of image stream input interfaces or from another image processing module;
a second image processing module; and
a switching matrix in communication with the plurality of image stream input interfaces, the image stream output interface, the first image processing module, and the second image processing module, wherein the switching matrix is configured to:

selectively map the image stream from the at least one of the plurality of image stream input interfaces or from the second image processing module, to the first image processing module, and selectively map the contiguous image stream from the first image processing module to the image stream output interface or to the second image processing module.

24. The vehicle vision system of claim 23, wherein the contiguous image stream is a panoramic view from a vantage of the plurality of image capture devices.

25. The vehicle vision system of claim 23, wherein the switching matrix is configured to adjust the selective mapping in real time such that, a particular image stream is added to or removed from the plurality of image streams being accepted by the first image processing module.

26. The vehicle vision system of claim 23, wherein the vehicle is a ground vehicle, aircraft, watercraft, or a spacecraft.

27. The vehicle vision system of claim 23, wherein the image stream output interface is coupled to a display device disposed in a passenger cabin of the vehicle.

28. The vehicle vision system of claim 23, wherein at least one of the image capture devices comprises a video camera, an infrared camera, or an x-ray camera.

29. The vehicle vision system of claim 23, wherein the first image processing module performs stitching at frame-level.

30. The vehicle vision system of claim 23, wherein the vehicle vision system is coupled to another vehicle vision system and configured to transmit a shared image stream from the vehicle vision system to the other vehicle system, wherein the shared image stream is an image stream from at least one of the plurality of image stream input interfaces, the contiguous image stream, or a processed image stream outputted by the second image processing module.

31. The vehicle vision system of claim 30, wherein the other vehicle vision system is disposed at another vehicle, the vehicle vision system is coupled to the other vehicle vision system through a network connection between the vehicle and the other vehicle, and the shared image stream is transmitted from the vehicle to the other vehicle over a network connection.

32. The vehicle vision system of claim 23, wherein the second image processing module is configured to accept a second image stream from the image stream input interface or from another image processing module, apply an image processing function to the second image stream, and output a processed image stream.

33. The vehicle vision system of claim 32, wherein the image processing function comprises an image stream mix function, an image stream scale function, an image stream blend function, an image stream encoding function, an image stream enhancement function, or image stream cropping function.

34. The vehicle vision system of claim 33, wherein the image stream encoding function comprises a video or audio compression algorithm.

35. The vehicle vision system of claim 33, wherein the image stream enhancement function comprises a de-haze function, a de-blur function, a shadow function, a dawn-dusk function, a fusion function, a stabilization function, a thermal turbulence function, an equalization function, an edge detection function, a rain and fog function, or a light optimizing function.

* * * * *

UNITED STATES PATENT AND TRADEMARK OFFICE
CERTIFICATE OF CORRECTION

PATENT NO. : 8,713,215 B2  Page 1 of 1
APPLICATION NO. : 13/609133
DATED : April 29, 2014
INVENTOR(S) : Jack Wade et al.

It is certified that error appears in the above-identified patent and that said Letters Patent is hereby corrected as shown below:

In the Specification

Column 2, line 56, "output interlace" should read --output interface--

Column 2, line 62, "output interlace" should read --output interface--

Column 5, line 25, "input interlace" should read --input interface--

Column 6, line 23, "input interlace" should read --input interface--

Column 9, line 6 and 7, "output interlace" should read --output interface--

Column 13, line 9, "The GUI 106 interlaces" should read --The GUI 106 interfaces--

Column 25, line 31, "FPCAs" should read --FPGAs--

Signed and Sealed this
Eighth Day of July, 2014

Michelle K. Lee
*Deputy Director of the United States Patent and Trademark Office*